(12) United States Patent
Harada et al.

(10) Patent No.: US 9,023,476 B2
(45) Date of Patent: May 5, 2015

(54) RESIN PARTICLE COMPRISING MICROPARTICLE HAVING SPECIFIC DEGREE OF SWELLING AND CONTAINING VINYL-MONOMER-BASED RESIN OF SPECIFIC SOLUBILITY PARAMETER, AND METHOD FOR PRODUCING SAME

(75) Inventors: Hideo Harada, Kyoto (JP); Kenta Nose, Kyoto (JP); Masaru Honda, Kyoto (JP); Eiji Iwawaki, Kyoto (JP); Takahiro Tanaka, Kyoto (JP)

(73) Assignee: Sanyo Chemical Industries, Ltd., Kyoto-shi (JP)

( * ) Notice: Subject to any disclaimer, the term of this patent is extended or adjusted under 35 U.S.C. 154(b) by 241 days.

(21) Appl. No.: 13/700,646

(22) PCT Filed: May 27, 2011

(86) PCT No.: PCT/JP2011/002963
§ 371 (c)(1),
(2), (4) Date: Nov. 28, 2012

(87) PCT Pub. No.: WO2011/152008
PCT Pub. Date: Dec. 8, 2011

(65) Prior Publication Data
US 2013/0071665 A1    Mar. 21, 2013

(30) Foreign Application Priority Data

May 31, 2010 (JP) .................................. 2010-125285
Feb. 16, 2011 (JP) .................................. 2011-031315

(51) Int. Cl.
*B23B 5/16* (2006.01)
*B05D 7/00* (2006.01)
(Continued)

(52) U.S. Cl.
CPC ............ *C08L 83/06* (2013.01); *Y10T 428/2998* (2015.01); *Y10T 428/2995* (2015.01);
(Continued)

(58) Field of Classification Search
CPC .............. C08J 3/126; C08J 3/16; C08J 3/205; C08G 18/409
USPC ........... 428/403–407; 427/212–220, 201, 222
See application file for complete search history.

(56) References Cited

U.S. PATENT DOCUMENTS

2011/0020741 A1    1/2011  Mizumori et al.
2011/0060110 A1*   3/2011  Shindo et al. .................. 525/437
(Continued)

FOREIGN PATENT DOCUMENTS

JP    2006-321830 A    11/2006
JP    2007-277511 A    10/2007
(Continued)

OTHER PUBLICATIONS

International Search Report of PCT/JP2011/002963, mailing date of Aug. 16, 2011.

*Primary Examiner* — Holly Le
(74) *Attorney, Agent, or Firm* — Westerman, Hattori, Daniels & Adrian, LLP

(57) ABSTRACT

Disclosed is a resin particle having excellent low-temperature fusibility, having a sufficiently narrow size distribution, and that is obtained using a liquid or supercritical fluid. In the resin particle (C), which comprises a microparticle (A) containing a resin (a) being coated to or adhered to the surface of a resin particle (B) that contains another resin (b), the degree of swelling of the microparticle (A) resulting from liquid or supercritical carbon dioxide (X) at a temperature less than the glass transition temperature or the melting point of the microparticle (A) is no greater than 16%, and with the resin (a) as a constituent unit, the resin particle (C) contains 0.1-50 wt % of a non-crystalline non-halogen vinyl monomer (m1) of which the solubility parameter (SP value: $(cal/cm^3)^{1/2}$) is 7-9.

15 Claims, 1 Drawing Sheet

(51) Int. Cl.
*C08L 83/06* (2006.01)
*C08J 3/12* (2006.01)
*C08L 67/02* (2006.01)
*C08L 75/04* (2006.01)
*C08G 18/73* (2006.01)
*C08G 18/75* (2006.01)
*C08G 18/81* (2006.01)
*C08G 18/10* (2006.01)
*C08G 18/42* (2006.01)
*C08G 77/20* (2006.01)

(52) U.S. Cl.
CPC .............. *C08J3/126* (2013.01); *C08J 2300/00* (2013.01); *C08J 2383/00* (2013.01); *C08L 67/02* (2013.01); *C08L 75/04* (2013.01); *C08G 18/73* (2013.01); *C08G 18/755* (2013.01); *C08G 18/8175* (2013.01); *C08G 18/10* (2013.01); *C08G 18/4216* (2013.01); *C08G 77/20* (2013.01)

(56) References Cited

U.S. PATENT DOCUMENTS

| | | | |
|---|---|---|---|
| 2011/0070442 A1* | 3/2011 | Asano et al. | 428/402 |
| 2011/0130523 A1* | 6/2011 | Mukai et al. | 525/418 |
| 2011/0144287 A1* | 6/2011 | Shindo et al. | 525/437 |

FOREIGN PATENT DOCUMENTS

| | | |
|---|---|---|
| JP | 2008-287088 A | 11/2008 |
| JP | 2009-052005 A | 3/2009 |
| JP | 2009-096994 A | 3/2009 |
| JP | 2010-132851 A | 6/2010 |
| WO | 03/106541 A1 | 12/2003 |
| WO | 2009/119055 A1 | 10/2009 |

* cited by examiner

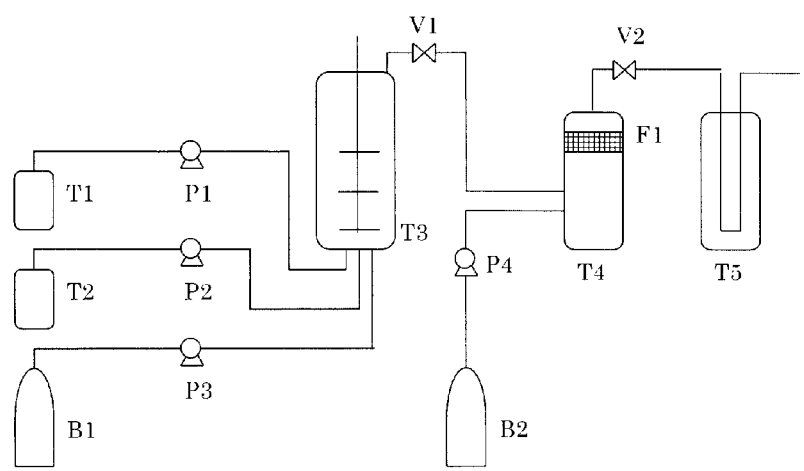

RESIN PARTICLE COMPRISING MICROPARTICLE HAVING SPECIFIC DEGREE OF SWELLING AND CONTAINING VINYL-MONOMER-BASED RESIN OF SPECIFIC SOLUBILITY PARAMETER, AND METHOD FOR PRODUCING SAME

TECHNICAL FIELD

The present invention relates to resin particles and a method for producing the resin particles using a liquid or supercritical fluid.

BACKGROUND ART

Conventionally, as a method of forming particles having excellent low-temperature fusibility in a nonaqueous medium, there is known a method of mechanically dispersing a resin solution in a liquid or supercritical fluid in the presence of a microparticle dispersing agent to form microparticles, followed by pressure reduction to obtain resin particles (Patent Documents 1, for example).

PRIOR ART DOCUMENT

Patent Document

Patent Document 1: JP-A-2010-132851

SUMMARY OF THE INVENTION

Problems to be Solved by the Invention

According to the method of dispersing a resin solution in a liquid or supercritical fluid in the presence of a microparticle dispersing agent as described above, as the dispersing agent, when inorganic microparticles such as hydrophobic silica are used, the low-temperature fusibility is insufficient, and when resin microparticles are used, it is possible to obtain particles having a narrow size distribution to some extent (Dv/Dn is 1.20), but particles having a further narrower size distribution are not obtained, so that it is difficult to obtain resin particles having both a sufficiently narrow size distribution and sufficient low-temperature fusibility.

An object of the present invention is to provide resin particles having a sufficiently narrow size distribution and excellent low-temperature fusibility obtained by using a liquid or supercritical fluid.

Solutions to the Problems

The present invention has been made in view of the above circumstances in the conventional art. That is, the present invention includes the following four inventions.
(I) A resin particle (C) comprising a microparticle (A) containing a resin (a) being coated to or adhered to the surface of a resin particle (B) containing a resin (b), wherein the degree of swelling of the microparticle (A) resulting from liquid or supercritical carbon dioxide (X) at a temperature less than the glass transition temperature or the melting point of the microparticle (A) is no greater than 16%, and the resin (a) contains, as a constituent unit, 0.1 to 50 wt % of a non-crystalline non-halogen vinyl monomer (m1) having a solubility parameter [SP value: $(cal/cm^3)^{1/2}$] of 7 to 9.
(II) A method for producing the resin particle (I), comprising the steps of: dispersing a precursor (b0) of a resin (b) in liquid or supercritical carbon dioxide (X) in which a microparticle (A) containing a resin (a) is dispersed; allowing the precursor (b0) to react to form a resin particle (C) in which the microparticle (A) is adhered to the surface of a resin particle (B) containing the resin (b); and then removing the liquid or supercritical carbon dioxide (X) to obtain the resin particle (C).
(III) A method for producing the resin particle (I), comprising the steps of: dispersing a solution (L), which is obtained by dissolving a resin (b) in a solvent (S), in liquid or supercritical carbon dioxide (X) in which a microparticle (A) containing a resin (a) is dispersed to form a resin particle (C1) in which the microparticle (A) is adhered to the surface of a resin particle (B1) containing the resin (b) and the solvent (S); and then removing the liquid or supercritical carbon dioxide (X) and the solvent (S) to obtain a resin particle (C).
(IV) A method for producing the resin particle (I), comprising the steps of: dispersing a solution (L0), which is obtained by dissolving a precursor (b0) of a resin (b) in a solvent (S), in liquid or supercritical carbon dioxide (X) in which a microparticle (A) containing a resin (a) is dispersed; allowing the precursor (b0) to react to form a resin particle (C1) in which the microparticle (A) is adhered to the surface of a resin particle (B1) containing the resin (b) and the solvent (S); and removing the liquid or supercritical carbon dioxide (X) and the solvent (S) to obtain a resin particle (C).

Effects of the Invention

The resin particles of the present invention, and resin particles obtained by the production method of the present invention have a sufficiently narrow size distribution and excellent low-temperature fusibility, and realize a good hygrothermal storage stability of the resin particles.

BRIEF DESCRIPTION OF THE DRAWINGS

FIG. 1 is an experiment device used for making resin particles.

MODE FOR CARRYING OUT THE INVENTION

Hereinafter, the present invention will be described in detail. The microparticle (A) is a microparticle having a degree of swelling resulting from liquid or supercritical carbon dioxide (X) [hereinafter, sometimes referred to as carbon dioxide (X)] (hereinafter, referred to as degree of swelling) at a temperature less than its glass transition temperature (hereinafter, sometimes referred to as Tg) or its melting point of no greater than 16%, preferably no greater than 10%, and more preferably no greater than 5%. When a microparticle having a degree of swelling greater than 16% is used, it is impossible to suppress aggregation of resin particles, so that the size distribution of resin particles is impaired.

As a method of measuring the degree of swelling, a magnetic floating balance can be used for measurement. The details of the measurement method of the degree of swelling are described in J. Supercritical Fluids. 19, 187-198 (2001).

The microparticle (A) contains a resin (a). The resin (a) may be any of a crystalline resin (a1) and a non-crystalline resin (a2), and preferably the crystalline resin (a1).

In the present invention, the crystalline resin means a resin having a melting point of 30 to 150° C., and the non-crystalline resin means a resin other than the crystalline resin (a resin having no melting point or having a melting point other than the range described above). The measurement of the melting point can be determined from an endothermic peak in differential scanning calorimetry (hereinafter, referred to as DSC).

Examples of the composition of the resin (a) include a vinyl resin, a composite resin of a vinyl resin and other resins, and the like.

The resin (a) contains, as an essential constituent unit, a non-crystalline non-halogen vinyl monomer (m1) having a solubility parameter [SP value: $(cal/cm^3)^{1/2}$] of 7 to 9.

In the present invention, the crystalline vinyl monomer means a monomer whose homopolymer is a crystalline vinyl resin having a melting point of 30 to 150° C., and the non-crystalline vinyl monomer means a monomer other than the crystalline vinyl monomer (a monomer whose homopolymer has no melting point or has a melting point other than the range described above). In addition, the non-halogen vinyl monomer means a monomer that has no halogen element.

The SP value of (m1) is generally 7 to 9, preferably 7.2 to 8.8, and further preferably 7.4 to 8.6. The SP value is represented by the square root of a ratio of a cohesion energy density and a molecular volume as shown below.

$$SP = (\Delta/V)^{1/2}$$

Here, $\Delta E$ represents a cohesion energy density. V represents a molecular volume, and the value is based on the calculation by Robert F. Fedors et al., and described, for example, in Polymer engineering and science, vol. 14, pp. 147 to 154.

The resin (a) contains, as a constituent unit, a non-crystalline non-halogen vinyl monomer (m1) having an SP value of 7 to 9, whereby the microparticle (A) containing the resin (a) has a good dispersion stability in producing a resin particle (C).

The vinyl monomer (m1) may be a vinyl monomer with any composition, as long as it has an SP value of 7 to 9 and no halogen element and is non-crystalline, preferably at least one kind of vinyl monomer selected from a silicone-containing vinyl monomer (m11) and a branched alkyl group-containing vinyl monomer (m12) having a carbon number of 8 to 30, and more preferably (m11).

The silicone-containing vinyl monomer (m11) is a compound having a silicone chain and a vinyl-polymerizable unsaturated group. Examples of the silicone chain include polydimethylsiloxane, those obtained by partially substituting polydimethylsiloxane with an alkyl group having a carbon number of 2 to 20 (ethyl group, propyl group, butyl group, octyl group, decyl group or the like) and/or a phenyl group, and the like. Examples of the vinyl-polymerizable unsaturated group include a (meth)acryl group and the like.

Concrete examples of (m11) include (meth)acryl modified silicone and the like, such as the following formula,

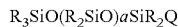

[wherein, R is one or more kinds of groups selected from an alkyl group having a carbon number of 1 to 20 and a phenyl group (each R may be the same or different), a is an average value and a number of 3 to 1000, and Q is an organic modifies group including (meth)acryl group. Examples of Q include —$C_3H_6OCOC(CH_3)$=$CH_2$, —$C_3H_6OCOCH$=$CH_2$ and the like.]

The (meth)acryl described above means acryl and/or methacryl, and the same description will be used hereinafter.

Concrete examples of (m11) include, as the methacryl-modified silicone, X22-2475 (manufactured by Shin-Etsu Chemical Co., Ltd.), X22-174DX (manufactured by Shin-Etsu Chemical Co., Ltd.), X22-2426 (manufactured by Shin-Etsu Chemical Co., Ltd.), FM0711 (manufactured by CHISSO CORPORATION), FM0721 (manufactured by CHISSO CORPORATION), FM0725 (manufactured by CHISSO CORPORATION), TM-0701 (manufactured by CHISSO CORPORATION), TM-0701T (manufactured by CHISSO CORPORATION), 5710 (manufactured by CHISSO CORPORATION) and the like; and, as the acryl-modified silicone, X22-1615 (manufactured by Shin-Etsu Chemical Co., Ltd.), X22-1618 (manufactured by Shin-Etsu Chemical Co., Ltd.) and the like.

Examples of the branched alkyl group-containing vinyl monomer (m12) having a carbon number (a carbon number of the entire alkyl group) of 8 to 30 include a (meth)acrylate having a branched alkyl group having a carbon number of 8 to 30 and the like. Concrete examples of (m12) include 2-ethylhexyl(meth)acrylate, 2-ethyldodecyl(meth)acrylate, 2-ethylhexadecyl(meth)acrylate, 2-ethylheptadecyl(meth)acrylate, 2-ethyloctadecyl(meth)acrylate, 2-ethyleicosyl(meth)acrylate, and 2-decyltetradecyl(meth)acrylate. Among these, a branched alkyl(meth)acrylate with the branched alkyl group having a carbon number of 12 to 28 is preferred, and 2-decyltetradecyl(meth)acrylate is more preferred.

The (meth)acrylate described above means acrylate and/or methacrylate, and the same description will be used hereinafter.

The weight average molecular weight [measured by gel permeation chromatography (GPC), hereinafter, sometimes abbreviated as an Mw] of the non-crystalline non-halogen vinyl monomer (m1) having an SP value of 7 to 9 is preferably 150 to 100000, and more preferably 300 to 80000, which allows the number average molecular weight (hereinafter, sometimes abbreviated as an Mn) of the resin (a) to be easily adjusted to the preferable range described later.

In the present invention, the Mw and the Mn are measured by gel permeation chromatography (GPC) under the following conditions.

Device (one example): HLC-8120, manufactured by Tosoh Corporation
Column (one example): TSKgel GMHXL 2+TSKgel Multipore HXL-M (manufactured by Tosoh Corporation)
Measurement temperature: 40° C.
Sample solution: 2.5 g/L THF (tetrahydrofuran) solution
Solution injection amount: 100 μl
Detection device: refractive index detector
Reference substance: standard polystyrene, manufactured by Tosoh Corporation (TSKstandard POLYSTYRENE) 12 points (molecular weight 500 1050 2800 5970 9100 18100 37900 96400 190000 355000 1090000 2890000)

The content of (m1) in (a) is not less than 0.1 wt %, preferably not less than 0.5 wt %, more preferably not less than 2 wt %, particularly preferably not less than 3 wt %, and most preferably not less than 5 wt %, from the viewpoint of dispersibility in carbon dioxide (X). From the viewpoints of resin strength and thermal storage stability, it is no greater than 50 wt %, preferably no greater than 45 wt %, more preferably no greater than 40 wt %, and particularly preferably no greater than 35 wt %.

When the resin (a) is the crystalline resin (a1), the melting point of (a1) is preferably 50 to 110° C., more preferably 53 to 100° C., particularly preferably 55 to 90° C., and most preferably 60 to 80° C. When the melting point of (a1) is not less than 50° C., the resin particle (C) of the present invention is less likely to block after long-term storage.

The crystallinity of the crystalline resin (a1) is preferably 20 to 95%, and more preferably 30 to 80%, from the viewpoints of suppression of swelling resulting from carbon dioxide (X) and adsorptivity to the resin particle (B). As to the crystallinity, the melting heat quantity [$\Delta Hm$ (J/g)] is determined from the area of an endothermic peak using DSC, and the crystallinity (%) is calculated from the measured ΔHm according to the following formula.

$$\text{Crystallinity} = (\Delta Hm/a)100$$

In the above formula, a is measured as follows.

The melting heat quantity of a resin which is to be an authentic sample having the same composition as the resin to be measured is measured by DSC, and the crystallinity is measured by a method according to JISK0131 (1996) (X-ray diffraction analysis general rule 13 crystallinity measurement, (2) Absolute method). Setting coordinates of the melting heat quantity on the vertical axis and the crystallinity on the horizontal axis, data of the authentic sample is plotted, and a straight line is drawn from two points which are the plotted point and the original point, and extrapolation is effected so that the crystallinity is 100%. The value of the melting heat quantity thus determined is a.

The Mn of the resin (a) is preferably not less than 1000, more preferably not less than 1500, particularly preferably not less than 2000, and most preferably not less than 10000, from the viewpoint of durability of the resin particle (C). From the viewpoint of melt viscosity of (C), it is preferably no greater than 1000000, more preferably no greater than 500000, particularly preferably no greater than 300000, and most preferably no greater than 150000.

The SP value of the resin (a) is preferably 6 to 14, and more preferably 8 to 12, from the viewpoint of dispersion stability of the microparticle (A) containing (a) in producing the resin particle (C).

The resin (a) is preferably a crystalline resin (a1) containing, as a constituent unit, the crystalline vinyl monomer (m2), together with the non-crystalline non-halogen vinyl monomer (m1) having an SP value of 7 to 9.

The composition of (m2) is not particularly limited, and preferable concrete examples thereof include an alkyl(meth)acrylate (m21) with the alkyl group having a carbon number of 12 to 50, an aliphatic vinyl hydrocarbon (m22) and the like.

As to the alkyl(meth)acrylate (m21) with the alkyl group having a carbon number of 12 to 50, the carbon number of the alkyl group is not less than 12, preferably not less than 14, and more preferably not less than 18, from the viewpoint of dispersion stability of the resin particle (C). Further, from the viewpoint of fixing property, it is no greater than 50, preferably no greater than 40, and more preferably no greater than 30. The alkyl group is preferably of a straight chain. Examples of (m21) include dodecyl(meth)acrylate, hexadecyl(meth)acrylate, heptadecyl(meth)acrylate, octadecyl(meth)acrylate, eicosyl(meth)acrylate, behenyl(meth)acrylate and the like, and preferably octadecyl(meth)acrylate, eicosyl(meth)acrylate, and behenyl(meth)acrylate.

Examples of the aliphatic vinyl hydrocarbon (m22) include ethylene, propylene and the like.

Among these, the alkyl(meth)acrylate (m21) with the alkyl group having a carbon number of 12 to 50 is preferred.

The content of the crystalline vinyl monomer (m2) in the crystalline resin (a1) as a constituent unit is preferably 30 to 99.9 wt %, more preferably 33 to 90 wt %, particularly preferably 35 to 80 wt %, and most preferably 40 to 70 wt %, from the viewpoint of fixing property.

The crystalline resin (a1) may contain, as a constituent unit, a vinyl monomer other than (m1) and (m2) described above. Examples of the vinyl monomer other than (m1) and (m2) include the following (1) to (11).

(1) Vinyl hydrocarbons:
(1-1) Alicyclic vinyl hydrocarbons: mono- or di-cycloalkenes and alkadienes such as (di)cyclopentadiene; and terpenes such as pinene.
(1-2) Aromatic vinyl hydrocarbons: styrene and its hydrocarbyl (alkyl, cycloalkyl, aralkyl and/or alkenyl) substitutes such as α-methylstyrene and 2,4-dimethylstyrene; and vinylnaphthalene.
(2) Carboxyl group-containing vinyl monomers and salts thereof: carboxyl group-containing vinyl monomers such as unsaturated monocarboxylic acids and unsaturated dicarboxylic acids each having a carbon number of 3 to 30, anhydrides thereof, and monoalkyl (having a carbon number of 1 to 24) esters thereof, such as (meth)acrylic acid, (anhydrous) maleic acid, maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester and cinnamic acid.
(3) Sulfone group-containing vinyl monomers, vinyl sulfuric acid monoesterified compounds and salts thereof: alkene sulfonic acids having a carbon number of 2 to 14 such as vinyl sulfonic acid; and alkyl derivatives thereof having a carbon number of 2 to 24 such as α-methylstyrene sulfonic acid; sulfo(hydroxy)alkyl-(meth)acrylate or (meth)acrylamide such as sulfopropyl(meth)acrylate, and sulfuric acid ester or sulfonic acid group-containing vinyl monomers; salts thereof, and the like.
(4) Phosphoric acid group-containing vinyl monomers and salts thereof: (meth)acryloyloxyalkyl (having a carbon number of 1 to 24) phosphoric acid monoesters such as 2-(meth)acryloyloxy ethylphosphate, phenyl-2-acryloyloxy ethylphosphate and (meth)acryloyloxy alkyl (having a carbon number of 1 to 24) phosphonic acids such as 2-acryloyloxy ethylphosphonic acid. Examples of salts of (2) to (4) described above include alkali metal salts (sodium salt, potassium salt and the like), alkaline earth metal salts (calcium salt, magnesium salt and the like), ammonium salt, amine salt and quaternary ammonium salt are exemplified.
(5) Hydroxyl group-containing vinyl monomers: hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-butene-3-ol, 2-butene-1-ol, 2-butene-1,4-diol, propargyl alcohol, 2-hydroxyethyl propenyl ether, sucrose allyl ether and the like.
(6) Nitrogen-containing vinyl monomers:
(6-1) Amino group-containing vinyl monomers: aminoethyl (meth)acrylate and the like,
(6-2) Amide group-containing vinyl monomers: (meth)acrylamide, N-methyl(meth)acrylamide and the like,
(6-3) Nitrile group-containing vinyl monomers: (meth)acrylonitrile, cyanostyrene, cyanoacrylate and the like,
(6-4) Quaternary ammonium cation group-containing vinyl monomers: quaternized compounds of tertiary amine group-containing vinyl monomers such as dimethylaminoethyl (meth)acrylate, diethylaminoethyl(meth)acrylate, dimethylaminoethyl(meth)acrylamide, diethylaminoethyl(meth)acrylamide, and diallylamine (quaternized by using a quaternizing agent such as methyl chloride, dimethylsulfuric acid, benzyl chloride or dimethyl carbonate) and the like, and
(6-5) Nitro group-containing vinyl monomers: nitro styrene and the like.
(7) Epoxy group-containing vinyl monomers: glycidyl(meth)acrylate, p-vinyl phenylphenyl oxide and the like.
(8) Halogen element-containing vinyl monomers: chlorine-containing vinyl monomers such as vinyl chloride, vinylidene chloride, allyl chloride, chlorostyrene, dichlorostyrene, chloromethyl styrene, chloroprene; bromine-containing vinyl monomers such as vinyl bromide, bromostyrene; and fluorine-containing vinyl monomers such as perfluoroolefins [tetrafluoroethylene, hexafluoropropylene and the like], perfluorovinyl ethers [perfluoro(alkylvinyl ether), perfluoro(1,3-dioxol), perfluoro(2-methylene-4-methyl-1,3-dioxolane), perfluorobutenylvinyl ether and the like], hydrogen atom-containing fluoroolefins [vinylidene fluoride, trifluoroethylene, 1,2-difluoroethylene, vinyl fluoride, trifluoropropylene, perfluoro(butyl)ethylene and the like], polyfluoroalkyl(meth)acrylates [1,1-dihydro perfluorooctyl(meth)acrylate, (perfluoromethyl)methyl(meth)acrylate, 2-(perfluorooctyl)ethyl(meth)acrylate, 2-(perfluorohexyl)ethyl(meth)acrylate, 2-(perfluorobutyl)ethyl(meth)acrylate and the like] and fluorostyrenes [α-fluorostyrene, β-fluorostyrene, α,β-difluorostyrene, α-trifluoromethylstyrene, 2,4,6-tri(trifluoromethyl)styrene and the like] and the like.

(9) Vinyl esters, vinyl(thio)ethers, vinyl ketones, and vinyl sulfones:

(9-1) Vinyl esters such as vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth)acrylate, vinyl methoxy acetate, vinyl benzoate, ethyl α-ethoxyacrylate, alkyl(meth)acrylates having a straight chain alkyl group with a carbon number of 1 to 11 or a branched alkyl group with a carbon number of 3 to 7 [methyl (meth)acrylate, ethyl(meth)acrylate, propyl(meth)acrylate, butyl(meth)acrylate and the like], dialkyl fumarate (two alkyl groups are straight-chain, branched-chain, or alicyclic groups having a carbon number of 2 to 8), dialkyl maleate (two alkyl groups are straight-chain, branched-chain, or alicyclic groups having a carbon number of 2 to 8), poly(meth)allyloxy alkanes [diallyloxy ethane, triallyloxy ethane, tetraallyloxy ethane, tetraallyloxy propane, tetraallyloxy butane, tetramethallyloxy ethane and the like] and the like, vinyl monomers having a polyalkylene glycol chain [polyethylene glycol (Mn 300) mono(meth)acrylate, polypropylene glycol (Mn 500) monoacrylate, methyl alcohol ethylene oxide 10-mol adduct (meth)acrylate, lauryl alcohol ethylene oxide 30-mol adduct (meth)acrylate and the like], poly(meth)acrylates [poly(meth)acrylates of polyhydric alcohols: ethylene glycol di(meth)acrylate, propylene glycol di(meth)acrylate, neopentyl glycol di(meth)acrylate, trimethylol propane tri(meth) acrylate, polyethylene glycol di(meth)acrylate and the like] and the like, (9-2) Vinyl(thio)ethers such as vinylmethyl ether, and (9-3) Vinyl ketones such as vinylmethyl ketone.

(10) Other vinyl monomers: isocyanatoethyl(meth)acrylate, m-isopropenyl-α,α-dimethylbenzyl isocyanate and the like.

(11) Macromonomers having a resin chain with an Mn of 300 to 100000 (preferably 500 to 50000) such as a polyester chain and a polyurethane chain:

Examples of the composition of the part of the polyester chain and the polyurethane chain include those similar to the ones mentioned as the polyester resin and the polyurethane resin described later.

The microparticle (A) and the resin particle (B) may internally have an acidic functional group or a basic functional group. Examples of the acidic functional group include a carboxylic acid group, a sulfonic acid group and the like. Examples of the basic functional group include a primary amino group, a secondary amino group, a tertiary amino group and the like.

Resins may be used which have an acidic functional group or a basic functional group as the resin (a) and the resin (b) for giving an acidic functional group or a basic functional group to at least the surfaces of the microparticle (A) and the resin particle (B), or the microparticle (A) and the resin particle (B) may be subjected to a surface treatment for giving these functional groups.

Examples of the resin (a) having an acidic functional group include a vinyl resin obtained by copolymerization of monomers having an acidic functional group [for example, the carboxyl group-containing vinyl monomer (2), the sulfone group-containing vinyl monomer (3) and the like described above] and the like.

Examples of the resin (a) having a basic functional group include a vinyl resin obtained by copolymerization of monomers having a basic functional group [for example, the amino group-containing vinyl monomer (6-1) and the like described above] and the like.

In order to improve adsorptivity of the microparticle (A) and the resin particle (B), the resin (a) preferably has, as a part of its constituent unit, the constituent unit of a macromonomer (11) having a resin chain with an Mn of 500 to 100000 and having the same composition as the resin (b) contained in the resin particle (B).

From the above, as the monomer constituting the resin (a) other than the non-crystalline non-halogen vinyl monomer (m1) having an SP value of 7 to 9 and the crystalline vinyl monomer (m2), the carboxyl group-containing vinyl monomers (2), the sulfone group-containing vinyl monomers (3), the amino group-containing vinyl monomers (6-1), and the macromonomers (11) having a resin chain with an Mn of 500 to 100000 are preferred, and (2) and (11) are more preferred.

The total content of the vinyl monomers other than (m1) and (m2) in the constituent unit of the crystalline resin (a1) is preferably no greater than 50 wt %, more preferably 1 to 47 wt %, particularly preferably 5 to 45 wt %, and most preferably 10 to 40 wt %.

Examples of the production method of the vinyl resin include publicly known polymerization methods of vinyl monomers, such as solution polymerization, bulk polymerization and suspension polymerization.

The production method of the microparticle (A) containing the resin (a) may be any method, and concrete examples thereof include a dry production method [a method of dry-grinding a material (a') containing (a) constituting the microparticle (A) by means of a publicly known dry grinder such as a jet mill], and wet production methods [a method of dispersing a powder of (a') in an organic solvent, and wet-grinding it by means of a publicly known wet disperser such as a beads mill or a roll mill, a method of spray-drying a solvent solution of (a') by means of a spray drier or the like, a method of supersaturating a solvent solution of (a') to cause deposition by addition of a poor solvent or cooling, a method of dispersing a solvent solution of (a') in water or an organic solvent, a method of polymerizing a precursor of (a') in water by emulsion polymerization, soap free emulsion polymerization, seed polymerization, suspension polymerization or the like, and a method of polymerizing a precursor of (a') in an organic solvent by dispersion polymerization or the like]. Among these, from the viewpoint of easiness of production of the microparticle (A), the wet production methods are preferred, and the methods based on deposition, emulsion polymerization and dispersion polymerization are more preferred.

The microparticle (A) may be used as it is, or may be surface-modified, for example, by a surface treatment with a silane-, titanate-, or aluminate-based coupling agent, by a surface treatment with various surfactants, by a coating treatment with a polymer, or the like, for imparting adsorptivity to the resin particle (B) or for modifying powder characteristics and electric characteristics of the resin particle (C) of the present invention. It is preferred that either one of the microparticle (A) and the resin particle (B) has an acidic functional group on at least its surface, and the other one has a basic functional group on at least its surface.

The resin particle (B) contains the resin (b). In the present invention, examples of the resin (b) include a thermoplastic resin (b1), a resin (b2) obtained by slightly crosslinking the thermoplastic resin, and a polymer blend (b3) including a thermoplastic resin as a sea component and a cured resin as an island component, and two or more kinds may be used in combination.

The thermoplastic resin (b1) may be any of a crystalline resin, a non-crystalline resin and a composite resin (a block resin) obtained by binding a crystalline resin and a non-crystalline resin, and examples thereof include a vinyl resin, a polyurethane resin, an epoxy resin, a polyester resin, a composite resin thereof and the like. Among these, a vinyl resin, a polyurethane resin, a polyester resin, a composite resin thereof and combined use of these are preferred from the viewpoint of easily obtaining a dispersion of microspherical resin particles.

Examples of the vinyl resin include the same (co)polymers of vinyl monomers that constitute the vinyl resins used as aforementioned resin (a). However, it is not necessary to use non-crystalline non-halogen vinyl monomers (m1) having SP values of 7 to 9 and crystalline vinyl monomers (m2).

As the copolymer of the vinyl monomers, a polymer obtained by copolymerizing the aforementioned monomers (1) to (11), (m1) and (m2) with arbitrary proportion can be mentioned. Examples of such copolymer include styrene-(meth)acrylate copolymer, styrene-butadiene copolymer, (meth)acrylic acid-acrylate copolymer, styrene-acrylonitrile copolymer, styrene-maleic anhydride copolymer, styrene-(meth)acrylic acid copolymer, styrene-(meth)acrylic acid-divinylbenzene copolymer, and styrene-styrenesulfonic acid-(meth)acrylate copolymer, and the like.

Examples of the polyester resin include a polycondensation product of polyols and polycarboxylic acids (including acid anhydrides thereof and lower alkyl esters thereof), and the like. As the polyol, diols (12) and tri- or more-valent polyols (13) can be mentioned. As the polycarboxylic acid, dicarboxylic acids (14) and polycarboxylic acids (15) having 3 or more carboxyl groups can be mentioned.

The reaction ratio of the polyols and the polycarboxylic acids expressed by the equivalent ratio of hydroxyl group [OH] to carboxyl group [COOH], that is, [OH]/[COOH], is preferably in the range of 2/1 to 1/2, more preferably in the range of 1.5/1 to 1/1.2, and particularly preferably in the range of 1.3/1 to 1/1.

Examples of the diol (12) include alkylene glycols (ethylene glycol, 1,2-propylene glycol, 1,3-propylene glycol, 1,4-butanediol, 1,6-hexanediol, octanediol, decanediol, dodecanediol, tetradecanediol, neopentyl glycol, 2,2-diethyl-1,3-propanediol and the like); alkylene ether glycols (diethylene glycol, triethylene glycol, dipropylene glycol, polyethylene glycol, polypropylene glycol, polytetramethylene ether glycol and the like); alicyclic diols (1,4-cyclohexane dimethanol, hydrogenated bisphenol A and the like); bisphenols (bisphenol A, bisphenol F, bisphenol S and the like); alkylene oxides (ethylene oxide, propylene oxide, butylene oxide and the like) adducts of the above-mentioned alicyclic diols; alkylene oxides (ethylene oxide, propylene oxide, butylene oxide and the like) adducts of the above-mentioned bisphenols; polylactonediols (poly$\epsilon$-caprolactonediol and the like); polybutadienediol; and the like. Of these, alkylene glycols having a carbon number of 2 to 12 and alkylene oxide adducts of bisphenols are preferable, and the combination of alkylene oxide adducts of bisphenols and alkylene glycols having a carbon number of 2 to 12 are particularly preferable.

Examples of the tri- or more-valent polyol (13) include aliphatic polyhydric alcohols having 3 to 8 or more hydroxyl groups (glycerin, trimethylolethane, trimethylolpropane, pentaerythritol, sorbitol and the like); trisphenols (trisphenol PA and the like); novolac resins (phenol novolac, cresol novolac and the like); alkylene oxide adducts of above mentioned trisphenols; alkylene oxide adducts of the above mentioned novolac resins; acryl polyols [a copolymer of hydroxyethyl(meth)acrylate and other vinyl monomers, and the like)] and the like.

Examples of the dicarboxylic acid (14) include alkylenedicarboxylic acids (succinic acid, adipic acid, sebacic acid, azelaic acid, dodecanedicarboxylic acid, octadecanedicarboxylic acid and the like); alkenylenedicarboxylic acids (maleic acid, fumaric acid and the like); branched alkylenedicarboxylic acids having a carbon number of 8 or more [dimer acid, alkenylsuccinic acids (dodecenylsuccinic acid, pentadecenylsuccinic acid, octadecenylsuccinic acid and the like), alkylsuccinic acids (decylsuccinic acid, dodecyl succinic acid, octadecylsuccinic acid and the like)]; aromatic dicarboxylic acids (phthalic acid, isophthalic acid, terephthalic acid, naphthalenedicarboxylic acid and the like) and the like. Among these, alkenylenedicarboxylic acids having a carbon number of 4 to 20 and aromatic dicarboxylic acids having a carbon number of 8 to 20 are preferable.

Examples of the polycarboxylic acid (15) having 3 or more (3 to 6 or more) carboxyl groups include aromatic polycarboxylic acids having a carbon number of 9 to 20 (trimellitic acid, pyromellitic acid and the like) and the like.

In addition, as the dicarboxylic acids (14) or the polycarboxylic acids (15) having 3 or more carboxyl groups, the acid anhydrides or lower alkyl esters (methyl esters, ethyl esters, isopropyl esters and the like) of above mentioned compounds may be used.

Examples of the polyurethane resin include a polyaddition product of a polyisocyanate (16) and an active hydrogen group containing compound (D) {water, the polyols [the diol (12) and the tri- or more-valent polyol (13)], the dicarboxylic acid (14), the polycarboxylic acid (15) having or more carboxyl groups, the polyamine (17), the polythiol (18) and the like}, and the like.

Examples of the polyisocyanate (16) include aromatic polyisocyanates having a carbon number of 6 to 20 (excluding the carbon atom in the NCO group; the same shall apply hereinafter), aliphatic polyisocyanates having a carbon number of 2 to 18, alicyclic polyisocyanates having a carbon number of 4 to 15, araliphatic polyisocyanates having a carbon number of 8 to 15, and modified products of these polyisocyanates (modified polyisocyanates having urethane groups, carbodiimide groups, allophanate groups, urea groups, biuret groups, urethodione groups, urethoimine groups, isocyanurate groups, oxazolidone groups and the like), mixtures of two or more of these, and the like.

Concrete examples of the aromatic polyisocyanate include 1,3- and/or 1,4-phenylene diisocyanate, 2,4- and/or 2,6-tolylene diisocyanate (TDI), 2,4'- and/or 4,4'-diphenylmethane diisocyanate (MDI) and the like.

Concrete examples of the aliphatic polyisocyanate include ethylene diisocyanate, tetramethylene diisocyanate, hexamethylene diisocyanate (HDI), and the like.

Concrete examples of the alicyclic polyisocyanate include isophorone diisocyanate (IPDI), dicyclohexylmethane-4,4'- diisocyanate (hydrogenated MDI), cyclohexylene diisocyanate, methylcyclohexylene diisocyanate (hydrogenated TDI), and the like.

Concrete examples of the araliphatic polyisocyanate include m- and/or p-xylylene diisocyanate (XDI), α,α,α',α'-tetramethylxylylene diisocyanate (TMXDI), and the like.

In addition, above described modified products of polyisocyanates include modified products having a urethane group, a carbodiimide group, an allophanate group, a urea group, a biuret group, a urethodione group, a urethoimine group, an isocyanurate group, an oxazolidone group and the like. Concrete examples include modified MDI (urethane-modified MDI, carbodiimide-modified MDI, trihydrocarbylphosphate-modified MDI and the like), urethane-modified TDI, a mixture of two or more kinds of these [for example, a combination of the modified MDI and the urethane-modified TDI (isocyanate-containing prepolymer)], and the like.

Among these, the aromatic polyisocyanate having a carbon number of 6 to 15, the aliphatic polyisocyanate having a carbon number of 4 to 15, and the alicyclic polyisocyanate having a carbon number of 4 to 15 are preferable, and TDI, MDI, HDI, hydrogenated MDI, and IPDI are particularly preferable.

Examples of the polyamine (17) include the following substances.

Aliphatic polyamines (C2 to C18):

[1] Aliphatic polyamines {alkylene (C2 to C6) diamines (ethylenediamine, tetramethylenediamine, hexamethylenediamine and the like), polyalkylene (C2 to C6) polyamines [diethylenetriamine and the like]}

[2] Alkyl (C1 to C4) or hydroxyalkyl (C2 to C4) substitutes of these [dialkyl (C1 to C3) aminopropylamine and the like]

[3] Alicycle- or heterocycle-containing aliphatic polyamines [3,9-bis(3-aminopropyl)-2,4,8,10-tetraoxaspiro[5,5]undecane and the like]

[4] Aromatic ring-containing aliphatic amines (C8 to C15) (xylylene diamine, tetrachloro-p-xylylene diamine and the like), Alicyclic polyamines (C4 to C15): 1,3-diaminocyclohexane, isophoronediamine, menthenediamine, 4,4'-methylenedicyclohexanediamine (hydrogenated methylenedianiline) and the like, Aromatic polyamines (C6 to C20):

[1] Unsubstituted aromatic polyamines [1,2-, 1,3-, 1,4-phenylene diamine and the like; aromatic polyamines having nuclearly-substituted alkyl groups (C1 to C4 alkyl groups such as methyl, ethyl, n- or i-propyl, butyl and the like) such as 2,4- and 2,6-tolylene diamine and the like], and the mixture of various ratio of these isomers

[2] Aromatic polyamines having nuclearly-substituted electron-attracting groups (halogens such as Cl, Br, I, and F; alkoxy groups such as methoxy and ethoxy; a nitro group and the like) [methylenebis-o-chloroaniline and the like]

[3] Aromatic polyamines having a secondary amino group [—NH₂ of the aromatic polyamine of above (4) to (6) is partly or entirely substituted by —NH—R' (wherein R' represents a lower alkyl group such as methyl, ethyl and the like), [4,4'-di(methylamino)diphenylmethane, 1-methyl-2-methylamino-4-aminobenzene and the like], Heterocyclic polyamines (C4 to C15): piperazine, N-aminoethylpiperazine, 1,4-diaminoethylpiperazine, 1,4-bis(2-amino-2-methylpropyl)piperazine], and the like, Polyamide polyamines: low molecular-weight polyamide polyamines obtained by condensation of dicarboxylic acids (such as dimer acid and the like) with excess (that is, 2 or more mols per 1 mol of the acid) polyamines (the alkylenediamines and the polyalkylenepolyamines mentioned above and the like) and the like, Polyether polyamines: hydrogenated products of cyanoethylated compounds of polyether polyols (polyalkylene glycol and the like) and the like.

The examples of the polythiol (18) include ethylenedithiol, 1,4-butanedithiol, 1,6-hexanedithiol and the like.

Examples of the epoxy resin include a ring-opening polymerization product of the polyepoxide (19), a polyaddition product of the polyepoxide (19) and an active hydrogen group containing compound (D) {water, the polyols [above mentioned diol (12) and the tri- or more-valent polyol (13)], dicarboxylic acid (14), polycarboxylic acids (15) having 3 or more carboxyl groups, the polyamines (17), the polythiol (18) and the like}, or a cured product of the polyepoxide (19) and an acid anhydride of the dicarboxylic acid (14) or the polycarboxylic acid (15) having 3 or more carboxyl groups, and the like.

The polyepoxide (19) is not limited to any specific one as long as it has 2 or more epoxy groups in the molecule. From the viewpoint of mechanical characteristics of the cured product, it preferably has 2 to 6 epoxy groups in a molecule. The epoxy equivalent (that is, molecular weight per one epoxy group) of the polyepoxide (19) is preferably in the range of 65 to 1,000, more preferably in the range of 90 to 500. When the epoxy equivalent is 1,000 or less, the cross-linked structure tends to be dense, thus resulting in improving physical properties of the cured product, such as water resistance, chemical resistance, mechanical strength and the like, while the polyepoxides having an epoxy equivalent of 65 or more is easy to synthesize.

As the examples of the polyepoxide (19), aromatic polyepoxy compounds, heterocyclic polyepoxy compounds, alicyclic polyepoxy compounds, aliphatic polyepoxy compounds and the like can be mentioned. Examples of the aromatic polyepoxy compound include glycidyl ethers of polyhydric phenols, glycidyl esters of polyhydric phenols, glycidyl aromatic polyamines, glycidylation products of aminophenols and the like. Examples of the glycidyl ether of a polyhydric phenol include bisphenol F diglycidyl ether, bisphenol A diglycidyl ether and the like. Examples of the glycidyl ester of a polyhydric phenol include diglycidyl phthalate, diglycidyl isophthalate, diglycidyl terephthalate and the like. Examples of the glycidyl aromatic polyamine include N,N-diglycidyl aniline, N,N,N',N'-tetraglycidyl xylylenediamine, N,N,N',N'-tetraglycidyl diphenylmethanediamine, and the like. Furthermore, in the present invention, above described aromatic polyepoxy compounds include triglycidyl ether of p-aminophenol, diglycidyl urethane compounds obtained by the addition reaction of tolylene diisocyanate or diphenylmethane diisocyanate and glycidol, glycidyl group-containing polyurethane (pre)polymers obtained by the reaction of aforementioned two reaction products and polyol and diglycidyl ethers of alkylene oxide (ethylene oxide or propylene oxide) adducts of bisphenol A. An example of the heterocyclic polyepoxy compound includes trisglycidylmelamine. Examples of the alicyclic polyepoxy compound include vinylcyclohexene dioxide and the like. Furthermore, the alicyclic polyepoxy compounds include nuclear hydrogenated products of above described aromatic polyepoxy compounds. Examples of the aliphatic polyepoxy compound include polyglycidyl ethers of polyhydric aliphatic alcohols, polyglycidyl esters of polyvalent fatty acids, glycidyl aliphatic amines and the like. Examples of the polyglycidyl ether of a polyhydric aliphatic alcohol include ethylene glycol diglycidyl ether, propylene glycol diglycidyl ether and the like. Examples of the polyglycidyl ester of a polyvalent fatty acid include diglycidyl oxalate, diglycidyl maleate, diglycidyl succinate, diglycidyl glutarate, diglycidyl adipate, diglycidyl pimelate and the like.

An example of the glycidyl aliphatic amine includes N,N, N',N'-tetraglycidyl hexamethylenediamine. Furthermore, in the present invention, the aliphatic polyepoxy compounds include diglycidyl ether and (co)polymers of glycidyl(meth) acrylates. Among these, the aliphatic polyepoxy compounds and the aromatic polyepoxy compounds are preferable. The polyepoxides may be used in combination of two or more of them.

The resin (b2) obtained by slightly crosslinking a thermoplastic resin means a resin having a Tg of the resin (b) of 20 to 200° C. as a result of introduction of a crosslinked structure. Such a crosslinked structure may be of any crosslinked forms including a covalent bond, a coordinate bond, an ionic bond, a hydrogen bond and the like. As a concrete example, for example, when a polyester is selected as the resin (b2), a crosslinked structure can be introduced by using one having a number of functional groups of three or more as either one or both of the polyol and the polycarboxylic acid at the time of polymerization. Also, when a vinyl resin is selected as the resin (b2), a crosslinked structure can be introduced by adding a monomer having two or more double bonds at the time of polymerization.

Examples of the polymer blend (b3) having a thermoplastic resin as a sea component and a cured resin as an island component include one having a Tg of 20 to 200° C. and a softening starting temperature of 40 to 220° C., and concretely, a vinyl resin, a polyester resin, a polyurethane resin, an epoxy resin and a mixture thereof.

The Mn of the resin (b) is preferably 1000 to 5,000,000, and more preferably 2,000 to 500,000, and the SP value is preferably 7 to 18, and more preferably 8 to 14. For modification of heat characteristics of the resin particle (C) of the present invention, the resin (b2) or the resin (b3) may be used.

When the resin (b) is a non-crystalline resin, the glass transition temperature (Tg) is preferably 20° C. to 200° C., and more preferably 40° C. to 150° C. When it is not less than 20° C., storage stability of the resin particle (C) is good. The Tg in the present invention is a value determined by DSC measurement.

When the resin (b) is a non-crystalline resin, the softening starting temperature is preferably 40° C. to 220° C., and more preferably 50° C. to 200° C. When it is not less than 40° C., good long-term storage stability is realized. When it is no higher than 220° C., no problem arises because the fixing temperature does not increase. The softening starting temperature in the present invention is a value determined by flow tester measurement.

The volume average particle diameter of the resin particle (B) is preferably 1 to 10 µm, and more preferably 2 to 8 µm.

The resin particle (C) of the present invention is a particle comprising the microparticle (A) adhered to the surface of the resin particle (B), or a particle comprising the microparticle (A) being coated to the surface of the resin particle (B) to form a film. The expression that the microparticle (A) is adhered to the surface of the resin particle (B) excludes the case where (A) is simply attached to the surface of (B) and thus is easily detached therefrom.

The particle diameter of the microparticle (A) is smaller than that of the resin particle (B). The value of the particle diameter ratio [the volume average particle diameter of the microparticle (A)/[the volume average particle diameter of the resin particle (C) of the present invention] is preferably 0.001 to 0.3, more preferably 0.002 to 0.2, further preferably 0.003 to 0.1, and particularly preferably 0.01 to 0.08. Within the above ranges, (A) is adsorbed to the surface of (B) efficiently, so that the size distribution of the obtained resin particle (C) of the present invention is narrower.

The volume average particle diameter of the microparticle (A) is preferably 0.01 to 1.0 µm, and particularly preferably 0.02 to 0.8 µm. The volume average particle diameter can be measured by a dynamic light scattering particle size distribution measuring device (for example, LB-550: manufactured by HORIBA, Ltd.), a laser particle size distribution measuring device (for example, LA-920: manufactured by HORIBA, Ltd.), Multisizer III (manufactured by Beckman Coulter, Inc.) and the like.

The volume average particle diameter of the resin particle (C) of the present invention is preferably 1 to 10 µm, more preferably 2 to 8 µm, and further preferably 3 to 6 µm. When it is not less than 1 µm, a handling property as a powder is improved.

A ratio DV/DN between the volume average particle diameter DV of the resin particle (C) of the present invention and the number average particle diameter DN of the resin particle (C) of the present invention is preferably 1.0 to 1.3, more preferably 1.0 to 1.2, particularly preferably 1.0 to 1.18, and most preferably 1.0 to 1.17. When it is no greater than 1.3, powder characteristics (fluidity, charging uniformity and the like) and the resolution of an image are significantly improved.

From the viewpoints of particle diameter uniformity, powder fluidity, storage stability and the like of the resin particle (C) of the present invention, the surface coverage percentage of the particle resin (B) with the microparticle (A) or a film derived from (A) is preferably not less than 5%, and more preferably not less than 30%. It is to be noted that the surface coverage percentage can be determined based on the following formula from image analysis of an image obtained by a scanning electron microscope (SEM).

Surface coverage percentage (%)=100 [surface area of (B) of the part covered with (A) or a film derived from (A)]/ [surface area of (B) of the part covered with (A) or a film derived from (A)+area of the part where the surface of (B) is exposed]

In the resin particle (C) of the present invention, a weight ratio between the resin (a) constituting the microparticle (A) and the resin (b) constituting the resin particle (B) is preferably (0.1:99.9) to (30:70), and more preferably (0.2:99.8) to (20:80). A weight ratio between the resin (a) and the resin (b) falling within these ranges is preferred because both the low-temperature fixing property and the long-term storage stability are realized.

For example, when the resin (a) is the crystalline resin (a1), the weight percentage of the resin particle (C) described above may be measured by a method of calculating the weight percentage of the crystalline resin (a1) from the endothermic amount of an endothermic peak inherent to the crystalline resin (a1) by a publicly known method, for example, by DSC.

The resin particle (C) of the present invention is preferably obtained by the following production methods in which production is conducted in liquid or supercritical carbon dioxide (X).

Production Method (1)

A production method of obtaining a resin particle by dispersing a precursor (b0) of a resin (b) in carbon dioxide (X) in which a microparticle (A) is dispersed; allowing the precursor (b0) to react to form a resin particle (C) in which the microparticle (A) is adhered to the surface of a resin particle (B) containing the resin (b); and then removing the carbon dioxide (X).

Production Method (2)

A production method of obtaining a resin particle by dispersing a solution (L), which is obtained by dissolving a resin (b) in a solvent (S), in carbon dioxide (X) in which a microparticle (A) is dispersed to form a resin particle (C1) in which the microparticle (A) is adhered to the surface of a resin particle (B1) containing the resin (b) and the solvent (S); and then removing the carbon dioxide (X) and the solvent (S).

Production Method (3)

A production method of obtaining a resin particle by dispersing a solution (L0), which is obtained by dissolving a precursor (b0) of a resin (b) in a solvent (S), in carbon dioxide (X) in which a microparticle (A) is dispersed; allowing the precursor (b0) to react to form a resin particle (C1) in which the microparticle (A) is adhered to the surface of a resin particle (B1) containing the resin (b) and the solvent (S); and then removing the carbon dioxide (X) and the solvent (S).

Production Method (2) will be described in detail.

An insoluble content of the resin (b) relative to the solvent (S) in an equivalent weight mixture of the solvent (S) and the resin (b) at 23° C. and 0.1 MPa is preferably no greater than 20 wt %, and more preferably no greater than 15 wt %, relative to the weight of the resin (b). When the weight of the insoluble content is no greater than 20 wt %, the size distribution of the resin particle to be obtained is narrower.

In Production Method (3), the same also applies when the precursor (b0) is used in place of the resin (b), and when a mixture of the resin (b) and the precursor (b0) is used.

The SP value of the solvent (S) is preferably 9 to 16, and more preferably 10 to 15.

Concrete examples of the solvent (S) include ketone solvents (acetone, methyl ethyl ketone, and the like), ether solvents (tetrahydrofuran, diethyl ether, ethylene glycol monoalkyl ether, propylene glycol monoalkyl ether, cyclic ethers, and the like), ester solvents (acetic acid esters, pyruvic acid esters, 2-hydroxyisobutyric acid esters, lactic acid esters, and the like), amide solvents (dimethylformamide and the like), alcohols (methanol, ethanol, fluorine-containing alcohols, and the like), aromatic hydrocarbon solvents (toluene, xylene, and the like), aliphatic hydrocarbon solvents (octane, decane, and the like) and the like. A mixed solvent of two or more kinds of these solvents, or a mixed solvent of these organic solvents and water may also be used.

From the viewpoint of ease of particle formation, as a single solvent, dimethylformamide, a cyclic ether, a pyruvic acid ester, an ethylene glycol monoalkyl ether, a propylene glycol monoalkyl ether, a 2-hydroxyisobutyric acid ester, a lactic acid ester or a fluorine-containing alcohol is preferred.

Examples of the cyclic ether described above include 1,4-dioxane, 1,3-dioxolane and the like.

Examples of the pyruvic acid ester include methyl pyruvate, ethyl pyruvate and the like.

Examples of the ethylene glycol monoalkyl ether include ethylene glycol monomethyl ether, ethylene glycol monoethyl ether and the like.

Examples of the propylene glycol monoalkyl ether include propylene glycol monomethyl ether, propylene glycol monoethyl ether and the like.

Examples of the 2-hydroxyisobutyric acid ester include methyl 2-hydroxyisobutyrate and the like.

Examples of the lactic acid ester include methyl lactate, ethyl lactate and the like.

Examples of the fluorine-containing alcohol include 2,2,3,3-tetrafluoropropanol, trifluoroethanol and the like.

As the mixed solvent, a mixed solvent of acetone, methanol and water, a mixed solvent of acetone and methanol, a mixed solvent of acetone and ethanol, a mixed solvent of acetone and water, and a mixed solvent of methyl ethyl ketone and water are preferred.

The same applies to the solvent (S) in Production Method (3).

The solution (L) of the resin (b) is produced by dissolving the resin (b) in the solvent (S). The concentration of the resin (b) relative to the weight of the solution (L) is preferably 10 to 90 wt %, and more preferably 20 to 80 wt %.

The same applies to the concentration of the precursor (b0) in the solution (L0) in Production Method (3).

In the dispersing step of Production Method (2) of dispersing the solution (L) of the resin (b) in carbon dioxide (X), the dispersion stabilizer (E) described below may be used. The dispersion stabilizer (E) is a compound having at least one group of a dimethylsiloxane group and a fluorine-containing functional group. Further, it is preferred to have a chemical structure having affinity with the resin (b) together with a dimethylsiloxane group and a fluorine-containing group having affinity with carbon dioxide.

For example, when the resin (b) is a vinyl resin, the dispersion stabilizer (E) is preferably a vinyl resin that contains a monomer having at least one group of a dimethylsiloxane group and a fluorine-containing functional group as a constituent unit.

As a monomer having a dimethylsiloxane group (or a reactive oligomer) (M1-1), methacryl-modified silicone is preferred, and it has a structure shown by the following formula.

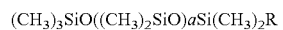

$(CH_3)_3SiO((CH_3)_2SiO)aSi(CH_3)_2R$

Here, a is 15 to 45 in an average value, and R is an organic modified group including a methacryl group. An example of R includes $—C_3H_6OCOC(CH_3)=CH_2$.

Examples of a fluorine-containing monomer (M1-2) include the fluorine-containing vinyl monomers from the halogen element-containing vinyl monomers (8) described above.

When the resin (b) is a urethane resin, the dispersion stabilizer (E) is preferably a urethane resin that includes a monomer having at least one group of a dimethylsiloxane group and a fluorine-containing functional group as a constituent unit.

As (M1-1), polysiloxanes having a functional group containing active hydrogen such as amino-modified silicone, carboxyl-modified silicone, carbinol-modified silicone and mercapto-modified silicone are preferred. As (M1-2), fluorine group-containing polyols such as 2,2 bis(4-hydroxyphenyl)hexafluoropropane and 3,3,4,4-tetrafluoro-1,6-hexanediol, fluorine compounds having a functional group containing active hydrogen such as fluorine group-containing (poly)amines and fluorine group-containing (poly)thiols, and fluorine group-containing (poly)isocyanates such as bis(isocyanatomethyl)perfluoropropane, bis(isocyanatomethyl)perfluorobutane, bis(isocyanatomethyl)perfluoropentane and bis(isocyanatomethyl)perfluorohexane are preferred.

When the resin (b) has an acid value, it is preferred that the dispersion stabilizer (E) has an amino group from the viewpoint of dispersibility. The acid value of the resin (b) is preferably 1 to 50, more preferably 3 to 40, and most preferably 5 to 30. The amino group may be any of primary, secondary and tertiary, and may be introduced into any positions including the side chain, either one of terminals, both terminals, and both terminals of the side chain of the compound containing a fluorine-containing group and a dimethylsiloxane group.

As the dispersion stabilizer (E), for example, a copolymer of the monomer having a dimethylsiloxane group (or a reactive oligomer) (M1-1) and/or the fluorine-containing monomer (M1-2), with the monomer constituting the above resin (b) (for example, a copolymer of methacryl-modified silicone and methyl methacrylate, a copolymer of heptafluorobutyl methacrylate and methyl methacrylate, and the like) is preferred. The copolymer may be in any form of random, block and graft forms, however, a block or graft form is preferred.

When the resin (b) has an acid value, it is preferred that the microparticle (A) has an amino group on the particle surface from the viewpoint of dispersion stability. The amino group may be any of primary, secondary and tertiary, and the form of containing an amino group is not particularly limited, and examples thereof include a method of allowing a compound having an amino group to be contained in the microparticle (A) by way of dispersion, impregnation or the like, a method using a compound having an amino group as a component constituting the microparticle (A), a method of reacting an amino group-containing coupling agent or the like on the surface of the microparticle (A), a method of allowing an amino group-containing compound to be adsorbed to the surface of the microparticle (A), and the like.

The amount of addition of the dispersion stabilizer (E) is preferably 0.01 to 50 wt %, more preferably 0.02 to 40 wt %, and particularly preferably 0.03 to 30 wt % relative to the weight of the resin (b) from the viewpoint of dispersion stability. The range of the Mw of the dispersion stabilizer (E) is preferably 100 to 100000, more preferably 200 to 50000, and particularly preferably 500 to 30000. Within these ranges, the dispersion stabilizing effect of (E) is improved.

Also in Production Methods (1) and (3), the dispersion stabilizer (E) may be used in the dispersing step.

In the present invention, the microparticle (A) may be dispersed in carbon dioxide (X) by any method, and examples thereof include a method of charging a vessel with (A) and (X) and directly dispersing (A) in (X) by stirring, ultrasonic radiation or the like, a method of introducing a dispersion liquid in which the microparticle (A) is dispersed in a solvent (T) into (X), and the like.

The weight percentage (wt %) of the microparticle (A) relative to the weight of carbon dioxide (X) is preferably no greater than 50, more preferably no greater than 30, and particularly preferably 0.1 to 20. Within these ranges, the resin particle (C1) can be produced efficiently.

Examples of the solvent (T) include those similar to the ones mentioned as the solvent (S). From the dispersibility of the microparticle (A), aliphatic hydrocarbon solvents (decane, hexane, heptane, and the like), and ester solvents (ethyl acetate, butyl acetate, and the like) are preferred.

As to the weight percentage (wt %) between the microparticle (A) and the solvent (T), although not particularly limited, no greater than 50 of the microparticle (A) relative to the solvent (T) is preferred, no greater than 30 is more preferred, and no greater than is particularly preferred. Within these ranges, the microparticle (A) can be introduced into (X) efficiently.

Examples of a method of dispersing the microparticle (A) in the solvent (T) include, but are not particularly limited to, a method of charging the microparticle (A) into the solvent (T) and directly dispersing the microparticle (A) by stirring, ultrasonic radiation or the like, a method of dissolving the microparticle in the solvent (T) at a high temperature to cause crystallization, and the like.

In this manner, a dispersion (X0) in which (A) is dispersed in carbon dioxide (X) is obtained. As the microparticle (A), those having a degree of swelling in the above range, and can be stably dispersed in (X) without being dissolved in (X) are preferred.

For dispersing in (X), the solution (L) of the resin (b) preferably has an appropriate viscosity, preferably no greater than 100 Pa·s, and more preferably no greater than 10 Pa·s from the viewpoint of the size distribution. The solubility of the resin (b) in (X) is preferably no greater than 3%, and more preferably no greater than 1%.

In the present invention, the solution (L) of the resin (b) may be dispersed in the dispersion (X0) in which the microparticle (A) is dispersed in carbon dioxide (X) by any method. Concrete examples thereof include a method of dispersing the solution (L) of the resin (b) in the dispersion (X0) by a stirrer, a disperser or the like, a method of forming a droplet by spraying the solution (L) of the resin (b) into the dispersion (X0) in which (A) is dispersed in carbon dioxide (X) via a spray nozzle, and bringing the resin in the droplet into a supersaturated state, thereby allowing for deposition of the resin particle (known as ASES: Aerosol Solvent Extraction System), a method of obtaining a particle by simultaneously blowing out the solution (L), the solution (L0), the precursor (b0) of the resin (b) and the dispersion (X0) together with a high-pressure gas, an entrainer and the like from separate tubes of coaxial multiple tubes (double tubes, triple tubes, and the like), thereby promoting division by application of external stress onto the droplet (known as SEDS: Solution Enhanced Dispersion by Supercritical Fluids), a method of ultrasonic radiation, and the like. The same also applies to the solution (L0) of the precursor (b0) of the resin (b) and the precursor (b0) of the resin (b) in Production Methods (3) and (1).

In this manner, the solution (L) of the resin (b) is dispersed in the dispersion (X0) in which (A) is dispersed in carbon dioxide (X), and the particle of the dispersed resin (b) is allowed to grow while the microparticle (A) is adsorbed to the surface, and thus the resin particle (C1) in which the microparticle (A) is adhered to the surface of the resin particle (B1) containing the resin (b) and the solvent (S) is formed. A dispersion in which (C1) is dispersed in (X) is referred to as a dispersion (X1).

The dispersion (X1) preferably has a single phase. That is, when the solution (L) of the resin (b) is used, it is not preferred that the phase of the solvent (S) separates into other phases than the phase containing carbon dioxide (X) in which (C1) is dispersed. Therefore, it is preferred to set the amount of the solution (L) of (b) relative to the dispersion (X0) so that a solvent phase will not separate off. For example, no greater than 90 wt % is preferred, 5 to 80 wt % is further preferred, and 10 to 70 wt % is particularly preferred, relative to (X0).

When the solution (L) of the resin (b), or the solution (L0) of the precursor (b0) of Production Method (3) is used, the amount of (S) contained in the resin particle (B1) containing the resin (b) and the solvent (S) is preferably 10 to 90 wt %, and more preferably 20 to 70 wt %.

The weight ratio (b):(X) between the resin (b) and carbon dioxide (X) is preferably 1:(0.1 to 100), more preferably 1:(0.5 to 50), and particularly preferably 1:(1 to 20). The same also applies to the weight ratio between the precursor (b0) and carbon dioxide (X) in Production Methods (1) and (3).

In the present invention, liquid carbon dioxide represents carbon dioxide in the temperature and pressure condition of the part surrounded by a gas-liquid boundary passing a triple point (temperature=−57° C., pressure=0.5 MPa) of carbon dioxide and a critical point (temperature=31° C., pressure=7.4 MPa) of carbon dioxide, an isothermal line of the critical temperature and a solid-liquid boundary on a phase chart represented by a temperature axis and a pressure axis of carbon dioxide, while supercritical carbon dioxide represents carbon dioxide in the temperature and pressure condition of not less than the critical temperature (provided that the pressure represents the total pressure in the case of a mixed gas of two or more components).

In Production Method (2) of the present invention, an operation conducted in carbon dioxide (X) is preferably carried out at the temperature described below. That is, for preventing carbon dioxide from transitioning to the solid phase in piping under reduced pressure and from clogging the channel, it is preferably not less than 30° C., and for preventing heat deterioration of the microparticle (A), the resin particle (B1) and the resin particle (C1), it is preferably no greater than 200° C. Furthermore, 30 to 150° C. is preferred, 34 to 130° C. is more preferred, 35 to 100° C. is particularly preferred, and 40° C. to 80° C. is most preferred. The same also applies to temperatures of the dispersion (X0) and the dispersion (X1). The same also applies to the cases of Production Methods (1) and (3). In Production Methods (1) to (3) of the present invention, an operation conducted in carbon dioxide (X) may be carried out at a temperature equal to or higher than, or less than the Tg or the melting point of the microparticle (A), however, it is preferably carried out at a temperature less than the Tg or the melting point.

In Production Method (2) of the present invention, an operation conducted in carbon dioxide (X) is preferably carried out at the pressure described below. That is, for satisfactorily dispersing the resin particle (C1) in (X), the pressure is preferably not less than 7 MPa, and from the viewpoints of installation cost and operation cost, it is preferably no greater than 40 MPa. It is more preferably 7.5 to 35 MPa, further preferably 8 to 30 MPa, particularly preferably 8.5 to 25 MPa, and most preferably 9 to 20 MPa. The same applies to the pressure in vessels where the dispersion (X0) and the dispersion (X1) are formed. The same also applies to the cases of Production Methods (1) and (3).

In Production Method (2) of the present invention, the temperature and the pressure of an operation conducted in carbon dioxide (X) are preferably set within a range so that the resin (b) is not dissolved in (X) and (b) can aggregate and unite. Usually, a target dispersion tends to hardly dissolve in (X) at a lower temperature and lower pressure, and (b) tends to aggregate and unite at a higher temperature and higher pressure. The same also applies to the dispersion (X0) and the dispersion (X1). The same also applies to the cases of Production Methods (1) and (3).

In carbon dioxide (X) of the present invention, other substances (e) may be appropriately contained for adjusting physical property values (viscosity, diffusion coefficient, dielectric constant, solubility, boundary tension and the like) as a dispersion medium, and examples thereof include inert gases such as nitrogen, helium, argon and air, and the like.

The weight percentage of carbon dioxide (X) in the total amount of carbon dioxide (X) and the other substances (e) in the present invention is preferably not less than 70%, more preferably not less than 80%, and particularly preferably not less than 90%.

From the dispersion (X1) in which the resin particle (C1) is dispersed, carbon dioxide (X) is removed usually by pressure reduction, to obtain the resin particle (C) of the present invention. At this time, the pressure reduction may be achieved stepwise by providing vessels with independently controlled pressures at multiple stages, or the pressure reduction may be conducted at once to normal temperature and normal pressure. The method of capturing the resin particles to be obtained is not particularly limited, and examples thereof include a method of separating the particles by a filter, and a method of centrifuging the particles by a cyclone or the like. Resin particles may be captured after pressure reduction, or pressure reduction may be effected after temporarily capturing them under high pressure prior to pressure reduction. For drawing out resin particles from under high pressure in the case of reducing the pressure after capturing them under high pressure, the pressure of a capturing vessel may be reduced by a batch operation, or a continuous draw out operation may be conducted using a rotary valve.

When the microparticle (A) contains the crystalline resin (a1), after forming the resin particle (C1), as an additional step, a step of heating the product to preferably not less than the melting point minus 50° C., more preferably not less than the melting point minus 10° C., or further preferably not less than the melting point of the crystalline resin (a1), thereby fusing the microparticle (A) attached to the surface of the resin particle (B), and adhering the microparticle (A) to the surface of the resin particle (B), or forming a film derived from the microparticle (A) to form a resin particle (C2) may be conducted as necessary. From the viewpoint of suppressing aggregation of (C2), the heating time is preferably 0.01 to 1 hour, and more preferably 0.05 to 0.7 hours.

In the resin particle (C) of the present invention obtained by Production Methods (1) to (3) of the present invention, the microparticle (A) is temporarily adhered to the surface of the resin particle (B) or (B1); however, the microparticle (A) may be coated and a film of (A) may be formed on the surface of (B) during the production operation depending on the composition of the resin (a) and the resin (b), and the kind of the solvent (S) or (T).

The resin particle (C) of the present invention may be any of the one produced by adhering the microparticle (A) to the surface of the resin particle (B), the one produced by forming a film derived from (A) on the surface of the resin particle (B), and the one produced by coating the surface of the resin particle (B) with part of (A).

Here, the surface condition and the shape of the resin particle (C) of the present invention may be observed, for example, in a photograph magnifying the surface of the resin particle at a magnification of 10,000 or 30,000 times using a scanning electron microscope (SEM).

After forming the resin particle (C1) [including the case of the resin particle (C2)], it is preferred to conduct an additional step of removing or reducing the solvent (S) as necessary. That is, when the solvent (S) is contained in the dispersion (X1) in which (C1) is dispersed in carbon dioxide (X), a solvent dissolved in (X1) will condense if the pressure of the vessel is reduced directly. This may lead to the problem that the resin particle (C1) is dissolved again, the resin particles (C1) unite during capture of the resin particles (C1), or the like. As a preferred method of removing or reducing the solvent, for example, carbon dioxide [preferably carbon dioxide (X)] is further mixed with the dispersion (X1) obtained by dispersing the solution (L) of the solvent (S) of the resin (b) in (X) and containing the resin particles (C1) to extract the solvent (S) into a phase of carbon dioxide from the resin particle (C1), and then carbon dioxide containing the solvent (S) is replaced with carbon dioxide not containing the solvent (S) [preferably carbon dioxide (X)], followed by pressure reduction.

As a method of mixing the dispersion (X1) in which the resin particle (C1) is dispersed in carbon dioxide (X) with carbon dioxide, carbon dioxide having higher pressure than (X1) may be added, or (X1) may be added to carbon dioxide having lower pressure than (X1), with the latter being preferred from the viewpoint of easiness of continuous operation. The amount of carbon dioxide to be mixed with (X1) is preferably 1 to 50 times, more preferably 1 to 40 times, and most preferably 1 to 30 times the volume of (X1) from the viewpoint of preventing uniting of the resin particles (C1). It is possible to prevent the resin particles (C1) from uniting by removing or reducing the solvent contained in the resin particle (C1) and then removing carbon dioxide as described above.

An example of the method of replacing carbon dioxide containing the solvent (S) with carbon dioxide not containing the solvent (S) includes a method of allowing carbon dioxide to flow until the solvent (S) is completely removed while keeping the pressure after temporarily capturing the resin particle (C1) with a filter or a cyclone. The amount of carbon dioxide that is allowed to flow is preferably 1 to 100 times, more preferably 1 to 50 times, and most preferably 1 to 30 times the volume of (X1) from the viewpoint of removing the solvent from the dispersion (X1).

Next, Production Method (1) will be described in detail.

In the present invention, as the precursor (b0) of the resin (b), any one capable of becoming the resin (b) as a result of chemical reaction may be used without any particular limitation, and for example, when the resin (b) is a vinyl resin, examples of (b0) include the vinyl monomers as described above (which may be used singly or as a mixture), and when the resin (b) is a condensation resin (for example, a polyurethane resin, an epoxy resin, or a polyester resin), an example of (b0) includes a combination of a prepolymer ($\alpha$) having a reactive group and a curing agent ($\beta$).

When a vinyl monomer is used as the precursor (b0), (b0) may contain a commonly used initiator. Examples of the initiator described above include a peroxide polymerization initiator (I), an azo polymerization initiator (II), and the like. Also a redox polymerization initiator (III) may be formed by using both the peroxide polymerization initiator (I) and a reducing agent. Further, two or more kinds of (I) to (III) may be used in combination.

When using the above initiator, it is preferred to preliminarily mix the initiator with a monomer before dispersing (b0) in carbon dioxide (X). The polymerization temperature is preferably 40 to 100° C., and more preferably 60 to 90° C.

As the precursor (b0), a combination of the prepolymer ($\alpha$) having a reactive group and the curing agent ($\beta$) may be used. Here, the "reactive group" means a group capable of reacting with the curing agent ($\beta$). Examples of a combination of a reactive group in the reactive group-containing prepolymer ($\alpha$) and the curing agent ($\beta$) include the following (1), (2), and the like.

(1): A combination in which a reactive group in the reactive group-containing prepolymer ($\alpha$) is a functional group ($\alpha1$) capable of reacting with an active hydrogen compound, and the curing agent ($\beta$) is an active hydrogen group-containing compound ($\beta1$).

(2): A combination in which a reactive group in the reactive group-containing prepolymer ($\alpha$) is an active hydrogen-containing group ($\alpha2$), and the curing agent ($\beta$) is a compound ($\beta2$) capable of reacting with an active hydrogen-containing group.

In the above combination (1), examples of the functional group ($\alpha1$) capable of reacting with an active hydrogen compound include an isocyanate group ($\alpha1a$), a blocked isocyanate group ($\alpha1b$), an epoxy group ($\alpha1c$), an acid anhydride group ($\alpha1d$), an acid halide group ($\alpha1e$), and the like. Among these, ($\alpha1a$), ($\alpha1b$) and ($\alpha1c$) are preferred, and ($\alpha1a$) and ($\alpha1b$) are particularly preferred. The blocked isocyanate group ($\alpha1b$) means an isocyanate group blocked with a blocking agent. Examples of the blocking agent described above include oximes [acetoxime, methylisobutylketoxime, diethylketoxime, cyclopentanoneoxime, cyclohexanoneoxime, methylethylketoxime and the like]; lactams [γ-butyrolactam, ε-caprolactam, γ-valerolactam and the like]; aliphatic alcohols having a carbon number of 1 to 20 [ethanol, methanol, octanol, and the like]; phenols [phenol, m-cresol, xylenol, nonylphenol, and the like]; active methylene compounds [acetylacetone, ethyl malonate, ethyl acetoacetate, and the like]; basic nitrogen-containing compounds [N,N-diethylhydroxylamine, 2-hydroxypyridine, pyridine N-oxide, 2-mercaptopyridine, and the like]; and a mixture of two or more kinds of these. Among these, oximes are preferred, and methylethylketoxime is particularly preferred.

Examples of a backbone of the reactive group-containing prepolymer ($\alpha$) include a polyether ($\alpha w$), a polyester ($\alpha x$), an epoxy resin ($\alpha y$), a polyurethane ($\alpha z$), and the like. Among these, ($\alpha x$), ($\alpha y$) and ($\alpha z$) are preferred, and ($\alpha x$) and ($\alpha z$) are particularly preferred. Examples of the polyether ($\alpha w$) include polyethylene oxide, polypropylene oxide, polybutylene oxide, polytetramethylene oxide, and the like. Examples of the polyester ($\alpha x$) include a polycondensate of a diol (12) and a dicarboxylic acid (14), a polylactone (a ring-opening polymer of ε-caprolactone), and the like. Examples of the epoxy resin ($\alpha y$) include addition condensates of bisphenols (bisphenol A, bisphenol F, bisphenol S, and the like) and epichlorohydrin, and the like. Examples of the polyurethane ($\alpha z$) include a polyadduct of the diol (12) and a polyisocyanate (16), a polyadduct of the polyester ($\alpha x$) and the polyisocyanate (16), and the like.

Examples of a method of adding a reactive group to the polyester ($\alpha x$), the epoxy resin ($\alpha y$), the polyurethane ($\alpha z$) and the like include (1): a method of allowing a functional group of a constituent component to remain in a terminal end by using one of two or more constituent components excessively, (2): a method of allowing a functional group of a constituent component to remain in a terminal end by using one of two or more constituent components excessively, and further allowing a compound having a functional group capable of reacting with the remaining functional group and a reactive group to react, and the like. In the above method (1), a hydroxyl group-containing polyester prepolymer, a carboxyl group-containing polyester prepolymer, an acid halide group-containing polyester prepolymer, a hydroxyl group-containing epoxy resin prepolymer, an epoxy group-containing epoxy resin prepolymer, a hydroxyl group-containing polyurethane prepolymer, an isocyanate group-containing polyurethane prepolymer, and the like are obtained. As to the ratio of constituent components, for example, in the case of the hydroxyl group-containing polyester prepolymer, the ratio between a polyol and a polycarboxylic acid is preferably 2/1 to 1/1, more preferably 1.5/1 to 1/1, and particularly preferably 1.3/1 to 1.02/1 by the mole ratio [OH]/[COOH] between the hydroxyl group [OH] and the carboxyl group [COOH]. Also in the case of a prepolymer having a different backbone or a different terminal group, only the constituent components vary but the ratio is as described above. In the above method (2), by reacting a polyisocyanate with the prepolymer obtained by the above method (1), an isocyanate group-containing prepolymer is obtained, by reacting a blocked polyisocyanate, a blocked isocyanate group-containing prepolymer is obtained, by reacting a polyepoxide, an epoxy group-containing prepolymer is obtained, and by reacting a polyacid anhydride, an acid anhydride group-containing prepolymer is obtained. As to the amount of use of a compound containing a functional group and a reactive group, for example, when an isocyanate group-containing polyester prepolymer is obtained by reacting a polyisocyanate with a hydroxyl group-containing polyester, the proportion of the polyisocyanate is preferably 5/1 to 1/1, more preferably 4/1 to 1.2/1, and particularly preferably 2.5/1 to 1.5/1 by the mole ratio [NCO]/[OH] between the isocyanate group [NCO] and the hydroxyl group [OH] of the hydroxyl group-containing polyester. Also in the case of a prepolymer having a different backbone or a different terminal group, only the constituent components vary, but the ratio is as described above.

The number of the reactive groups contained per one molecule in the reactive group-containing prepolymer ($\alpha$) is usually not less than 1, preferably 1.5 to 3, and more preferably 1.8 to 2.5 on average. Within the above ranges, the molecular weight of the cured product obtained by reaction with the curing agent ($\beta$) is increased. The Mn of the reactive group-containing prepolymer ($\alpha$) is preferably 500 to 30,000, more preferably 1,000 to 20,000, and particularly preferably 2,000 to 10,000. The Mw of the reactive group-containing prepolymer ($\alpha$) is 1,000 to 50,000, preferably 2,000 to 40,000, and more preferably 4,000 to 20,000. The viscosity of the reactive group-containing prepolymer ($\alpha$) at 100° C. is preferably no greater than 200 Pa·s, and more preferably no greater than 100 Pa·s. A viscosity of no greater than 200 Pa·s is preferred in that the resin particle (C) having a sharp size distribution is obtained with a small amount of a solvent.

Examples of the active hydrogen group-containing compound ($\beta$1) include a polyamine ($\beta$1a), a polyol ($\beta$1b), a polymercaptan ($\beta$1c), water ($\beta$1d) and the like which may be blocked by an eliminable compound. Among these, ($\beta$1a), ($\beta$1b) and ($\beta$1d) are preferred, ($\beta$1a) and ($\beta$1d) are more preferred, and the blocked polyamine ($\beta$1a) and ($\beta$1d) are particularly preferred. Examples of ($\beta$1a) include those similar to the ones mentioned as the polyamine (17). As ($\beta$1a), 4,4'-diaminodiphenylmethane, xylylenediamine, isophoronediamine, ethylenediamine, diethylenetriamine, triethylenetetramine, hexamethylenediamine and mixtures thereof are preferred.

Examples of the case where ($\beta$1a) is a polyamine blocked by an eliminable compound include ketimine compounds obtained from the above polyamines and ketones having a carbon number of 3 to 8 (acetone, methyl ethyl ketone, methyl isobutyl ketone, and the like), aldimine compounds obtained from aldehyde compounds having a carbon number of 2 to 8 (formaldehyde and acetaldehyde), enamine compounds, oxazolidine compounds and the like.

Examples of the polyol ($\beta$1b) include those similar to the ones mentioned as the diol (12) and the polyol (13) described above. The diol (12) alone, or a mixture of the diol (12) and a small amount of the polyol (13) is preferred.

Examples of the polymercaptan ($\beta$1c) include ethylenedithiol, 1,4-butanedithiol, 1,6-hexanedithiol, and the like.

A reaction terminator ($\beta$s) may be used together with the active hydrogen group-containing compound ($\beta$1) as necessary. By using a certain proportion of the reaction terminator together with ($\beta$1), it is possible to adjust (b) to have a predetermined molecular weight. Examples of the reaction terminator ($\beta$s) include monoamines (diethylamine, dibutylamine, butylamine, laurylamine, monoethanolamine, diethanolamine, and the like); blocked monoamines (a ketimine compound and the like); monools (methanol, ethanol, isopropanol, butanol, phenol; monomercaptans (butylmercaptan, laurylmercaptan, and the like); monoisocyanates (laurylisocyanate, phenylisocyanate, and the like); monoepoxides (butylglycidylether and the like); and the like.

Examples of the active hydrogen-containing group ($\alpha$2) in the reactive group-containing prepolymer ($\alpha$) in the above combination (2) include an amino group ($\alpha$2a), a hydroxyl group (an alcoholic hydroxyl group and a phenolic hydroxyl group) ($\alpha$2b), a mercapto group ($\alpha$2c), a carboxyl group ($\alpha$2d), organic groups ($\alpha$2e) obtained by blocking these groups with an eliminable compound, and the like. Among these, ($\alpha$2a), ($\alpha$2b) and the organic group ($\alpha$2e) obtained by blocking an amino group with an eliminable compound are preferred, and ($\alpha$2b) is particularly preferred. Examples of the organic group obtained by blocking an amino group with an eliminable compound include those similar to the ones mentioned in the case of ($\beta$1a) described above.

Examples of the compound ($\beta$2) capable of reacting with an active hydrogen-containing group include a polyisocyanate ($\beta$2a), a polyepoxide ($\beta$2b), a polycarboxylic acid ($\beta$2c), a polyacid anhydride ($\beta$2d), a polyacid halide ($\beta$2e) and the like. Among these, ($\beta$2a) and ($\beta$2b) are preferred, and ($\beta$2a) is more preferred.

Examples of the polyisocyanate ($\beta$2a) include those similar to the ones mentioned as the polyisocyanate (16), and preferred ones are also similar.

Examples of the polyepoxide ($\beta$2b) include those similar to the ones mentioned as the polyepoxide (19), and preferred ones are also similar.

Examples of the polycarboxylic acid ($\beta$2c) include a dicarboxylic acid ($\beta$2c-1) and a tri- or more-valent polycarboxylic acid ($\beta$2c-2), and preferred are ($\beta$2c-1) alone, and a mixture of ($\beta$2c-1) and a small amount of ($\beta$2c-2). Examples of the dicarboxylic acid ($\beta$2c-1) include those similar to the ones mentioned as the dicarboxylic acid (14) described above, and examples of the polycarboxylic acid include those similar to the ones mentioned as the polycarboxylic acid (15) described above, and preferred ones are also similar.

Examples of the polycarboxylic acid anhydride ($\beta$2d) include a pyromellitic anhydride and the like. Examples of the polyacid halide ($\beta$2e) include acid halides of ($\beta$2c) described above (acid chlorides, acid bromides and acid iodides), and the like. Further, the reaction terminator ($\beta$s) may be used together with ($\beta$2) as necessary.

The proportion of the curing agent ($\beta$) is preferably 1/2 to 2/1, more preferably 1.5/1 to 1/1.5, and particularly preferably 1.2/1 to 1/1.2 by the equivalent ratio [$\alpha$]/[$\beta$] between an equivalent [$\alpha$] of the reactive group in the reactive group-containing prepolymer ($\alpha$) and an equivalent of the active hydrogen-containing group [$\beta$] in the curing agent ($\beta$). When the curing agent ($\beta$) is water ($\beta$1d), water is treated as a bivalent active hydrogen compound.

When a combination of the prepolymer ($\alpha$) having a reactive group and the curing agent ($\beta$) is used as the precursor (b0), a method of reacting (b0) in the dispersion (X0) in which the microparticle (A) is dispersed in carbon dioxide (X) is not particularly limited, but a method of mixing ($\alpha$) and ($\beta$) immediately before dispersing (b0) in (X0) and allowing them to react at the same time with dispersion is preferred. The reaction time is selected according to the reactivity by a combination of the structure of the reactive group in the prepolymer ($\alpha$) and the curing agent ($\beta$), and it is preferably 5 minutes to 24 hours. The reaction may be completed in (X0) before pressure reduction, or the reaction may be allowed to a certain extent in (X0), and completed by aging in a thermostatic bath after reducing the pressure and drawing (C) out. Also, a publicly known catalyst may be used as necessary. Concrete examples thereof include, in the case of reaction of an isocyanate and an active hydrogen compound, dibutyltin laurate, dioctyltin laurate, and the like. The reaction temperature is preferably 30 to 100° C., and more preferably 40 to 80° C.

The resin (b) obtained by reaction of the precursor (b0) comprising the reactive group-containing prepolymer ($\alpha$) and the curing agent ($\beta$) is a constituent component of the resin particle (B) and the resin particle (C). The Mw of the resin (b) obtained by reaction of the reactive group-containing prepolymer (α) and the curing agent (β) is preferably not less than 3,000, more preferably 3,000 to 10000000, and particularly preferably 5000 to 1000000.

Further, at the time of reaction of the reactive group-containing prepolymer (α) and the curing agent (β), a polymer that is not reactive with the reactive group-containing prepolymer (α) and the curing agent (β) [a so-called dead polymer] may be contained in the system. In this case, (b) is a mixture of a resin obtained by reaction of the reactive group-containing prepolymer (α) and the curing agent (β), and an unreacted resin.

Production Method (1) is the same as Production Method (2) except for the above items and that the precursor (b0) is reacted at the time of dispersion using the precursor (b0) of the resin (b) in place of the solution (L) in which the resin (b) is dissolved in the solvent (S).

Production Method (3) will be described in detail.

It is the same as Production Method (2) except that the solution (L0) of the precursor (b0) of the resin (b) in the solvent (S) is used in place of the solution (L) of the resin (b) in the solvent (S), and the precursor (b0) is reacted at the time of dispersion.

According to Production Methods (1) to (3) described above, it is possible to produce the resin particle (C) of the present invention containing substantially no surface-active substance having a hydrophilic group. Here, examples of the surface-active substance having a hydrophilic group include an anion surfactant (S-1), a cation surfactant (S-2), an ampholytic surfactant (S-3), a nonionic surfactant (S-4), and the like.

Concrete examples of these surfactants include the ones described in WO 2003/106541. Usually, a resin particle produced by using a surface-active substance having a hydrophilic group in an aqueous solvent substantially contains the surface-active substance having a hydrophilic group.

An example of a method of analyzing that a resin particle contains substantially no surface-active substance having a hydrophilic group includes a publicly known surface wettability evaluation (according to Journal of Japan Society of Colour Material, vol. 73[3], 2000, P 132 to 138). An evaluation method of surface wettability is as follows. That is, 0.1 g of resin particles are introduced into a 100-mL beaker, and added with 20 mL of ion exchange water, stirred by a magnetic stirrer to allow the resin particles to float on the liquid surface, then acetone is added dropwise little by little, the acetone weight (Wa) and the water weight (Ww) at the time of disappearance of the resin particles floating on the surface are determined to three significant figures, and the solubility parameter (δm) of the resin particle surface is calculated from the formula (I).

$$\delta m = (9.75 Wa + 23.43 Ww)/(Wa + Ww) \quad (1)$$

When the solubility parameter (δm) of the resin particle surface is 9.8 to 21, and preferably 9.8 to 20, it is regarded that the resin particle contains substantially no surface-active substance having a hydrophilic group. When the δm is 9.8 to 21, the humidity resistant keeping property of the resin particle is good, and electrical characteristics, fluidity and the fixing property when used as resin particles for electrophotographic toner under high humidity are good. In the present measurement method, δm less than 9.8 cannot be measured.

The resin particle (C) can be provided with desired irregularities on the surface of the particle by varying the particle diameters of the microparticle (A) and the resin particle (B), and the surface coverage percentage of the resin particle (B) with the microparticle (A) or a film derived from (A). Further, a porous body having air bubbles inside is obtained by controlling the temperature and the pressure at the time of pressure reduction, so that a specific surface area can be increased. For improving powder fluidity, it is preferred that the BET specific surface area of the resin particle is 0.5 to 5.0 m²/g. The BET specific surface area is measured by using a specific surface area meter, for example, QUANTASORB (manufactured by Yuasa Ionics Inc.) (measurement gas: He/Kr=99.9/0.1 vol %, calibration gas: nitrogen). Likewise, from the viewpoint of powder fluidity, it is preferred that the surface average center line roughness Ra of the resin particle (C) of the present invention is 0.01 to 0.8 μm. The Ra is an arithmetic mean value of the absolute value of the variation between the roughness curve and its center line, and is measured, for example, by a scanning probe microscope system (manufactured by TOYO Corporation).

The resin particle (C) obtained by the production method of the present invention exhibits a sharp size distribution, and usually does not contain a water-soluble surface-active substance and an ionic substance, so that it is hydrophobic. Therefore, the resin particle (C) of the present invention is useful as a base particle for electrophotographic toner, an additive for paints, an additive for adhesives, an additive for cosmetics, an additive for paper coating, a resin for slush molding, a powdery paint, a spacer for production of electronic components, a carrier for catalysts, a standard particle for electronic measuring devices, a particle for electronic paper, a carrier for medical diagnosis, a chromatograph filler, a particle for electric viscous fluids, and the like.

In the resin particle (C) of the present invention, when the microparticle (A) contains the crystalline resin (a1) having a melting point of 50 to 110° C., it is particularly excellent in low-temperature fusibility and thermal storage stability.

EXAMPLES

In the following, the present invention will be further described by way of examples; however, the present invention is not limited to these examples. In the following description, "part(s)" represents part(s) by weight.

The degree of swelling, number average molecular weight (Mn), weight average molecular weight (Mw), melting point, and glass transition temperature described below were measured by the following methods. The SP value was measured by the method described above.

<Measurement Method of Degree of Swelling>

A sample (5 mg) was picked, and the weight at which supercritical carbon dioxide at 40° C. and 10 MPa penetrated the sample was measured by a magnetic floating balance (MSB-SCC•SCW manufactured by BEL Japan, Inc.), and the measured weight was divided by the weight of the sample, to determine the degree of swelling (%).

<Measurement Method of Number Average Molecular Weight (Mn) and Weight Average Molecular Weight (Mw)>

Measurement was conducted by GPC according to the method described above.

<Measurement Method of Melting Point>

A sample (5 mg) was picked and put in an aluminum pan, and the temperature (° C.) of the endothermic peak by crystal melting was determined by DSC (differential scanning calorimetry) (measuring device: RDC220, manufactured by SII Nano Technology Inc.) at a temperature rising speed of 10° C. per minute.

<Measurement Method of Glass Transition Temperature (Tg)>

A sample (5 mg) was weighed, and the glass transition temperature was measured by DSC (differential scanning Production Example 1

Preparation of Resin (b-1)

In a reaction vessel equipped with a condenser tube, a stirrer and a nitrogen inlet, 831 parts of 1,2-propylene glycol (herein after, referred to as propylene glycol), 703 parts of terephthalic acid, 47 parts of adipic acid, and 0.5 part of tetrabutoxy titanate as a condensation catalyst were charged and the reaction was carried out at 180° C. for hours under a nitrogen gas flow while removing the generated water. And then the temperature was gradually elevated to 230° C., removing the generated propylene glycol and water under a nitrogen gas flow, the reaction was performed for 4 hours. Furthermore, the reaction was performed under a reduced pressure of 5 to 20 mmHg, and the reaction mixture was cooled to 180° C. when the softening point reached 87° C., and further 24 parts of trimellitic anhydride and 0.5 part of tetrabutoxytitanate were added thereto. The reaction was carried out for 90 minutes and the product was taken out. The amount of the recovered propylene glycol was 442 parts. After cooling the resin to the room temperature, it was ground into particles to obtain a polyester resin (b-1). The Mn of the resin was 1900 and the Tg thereof was 45° C.

Production Example 2

Preparation of Resin (b-2)

In a reaction vessel equipped with a condenser tube, a stirrer and a nitrogen inlet, 729 parts of propylene glycol, 683 parts of terephthalic acid, 67 parts of adipic acid, 38 parts of trimellitic anhydride and 0.5 part of tetrabutoxytitanate as a condensation catalyst were charged, and a reaction was carried out at 180° C. for 8 hours under a nitrogen gas flow while removing the generated water. And then the temperature was gradually elevated to 230° C., removing the generated propylene glycol and water under a nitrogen gas flow, the reaction was performed for 4 hours. Furthermore, the reaction was performed under a reduced pressure of 5 to 20 mmHg. The amount of the recovered propylene glycol was 172 parts. When the softening point reached 160° C., the product was taken out. After cooling the resin to the room temperature, it was ground into particles to obtain a polyester resin (b-2). The Mn of the resin was 5700 and the Tg thereof was 63° C.

Production Example 3

Preparation of Resin (b-3)

Into an autoclave equipped with a stirring rod and a thermometer was placed 24 parts of xylene, and thereto were added dropwise, 2000 parts of a mixture of monomers consisting of butyl acrylate/methyl methacrylate/styrene/2-ethylhexyl acrylate (25 wt %/33 wt %/40 wt %/2 wt %) and 1 part of azobisisobutyronitrile at 170° C. over 3 hours and polymerized. The solution was degassed at normal pressure while the temperature being elevated to 180° C., and the operation was switched to pressure reduction upon 180° C., and then degassing was performed under reduced pressure over two hours to obtain a vinyl resin (b-3). The Mn of the resin was 10,500 and the Tg thereof was 62° C.

Production Example 4

Preparation of Resin Solution (L-1)

In a vessel equipped with an agitation device, a solvent (S-1) which was a mixed solvent consisting of 497 parts of acetone, 178 parts of methanol and 36 parts of ion-exchanged water, 231 parts of the resin (b-1) obtained in Production Example 1 and 58 parts of the resin (b-2) obtained in Production Example 2 were charged. The mixture was agitated until the resin (b-1) and the resin (b-2) were dissolved thoroughly, to obtain a resin solution (L-1). In the equal weight mixture of resin (b) and the solvent (S-1), the insoluble part of resin (b) to the solvent (S-1) at 23° C. and 0.1 MPa, {vs. the weight of the resin (b)} [herein after, referred to as insoluble part of the resin (b) to the solvent (S-)], was not more than 0.1 wt % and the SP value of the solvent (S-1) was 11.8.

Production Example 5

Preparation of Resin Solution (L-2)

In a vessel equipped with an agitation device, a solvent (S-2) which was a mixed solvent consisting of 500 parts of acetone and 214 parts of methanol and 286 parts of the resin (b-3) obtained in Production Example 3 were charged. The mixture was agitated until the resin (b-3) was dissolved thoroughly to obtain a resin solution (L-2). The insoluble part of the resin (b) to the solvent (S-2) was not more than 0.1 wt % and the SP value of the solvent (S-2) was 11.3.

Production Example 6

Preparation of resin Solution (L-3)

In a vessel equipped with an agitation device, a solvent (S-3) consisting of 712 parts of 1,3-dioxoran, 231 parts of the resin (b-1) obtained in Production Example 1 and 58 parts of the resin (b-2) obtained in Production Example 2 were charged. The mixture was agitated until the resins (b-1) and (b-2) were dissolved thoroughly to obtain a resin solution (L-3). The insoluble part of the resin (b) to the solvent (S-3) was 0.5 wt % and the SP value of the solvent (S-3) was 9.4.

Production Example 7

Preparation of Resin Solution (L-4)

In a vessel equipped with an agitation device, a solvent (S-4) consisting of 712 parts of propyleneglycol monomethylether, 231 parts of the resin (b-1) obtained in Production Example 1 and 58 parts of the resin (b-2) obtained in Production Example 2 were charged. The mixture was agitated until the resins (b-1) and (b-2) were dissolved thoroughly to obtain a resin solution (L-4). The insoluble part of the resin (b) to the solvent (S-4) was 3 wt % and the SP value of the solvent (S-4) was 11.3.

Production Example 8

Preparation of Resin Solution (L-5)

In a vessel equipped with an agitation device, a solvent (S-5) consisting of 712 parts of methyl lactate, 231 parts of the resin (b-1) obtained in Production Example 1 and 58 parts of the resin (b-2) obtained in Production Example 2 were charged. The mixture was agitated until the resins (b-1) and (b-2) were dissolved thoroughly to obtain a resin solution (L-5). The insoluble part of the resin (b) to the solvent (S-5) was 10 wt % and the SP value of the solvent (S-5) was 12.4.

Production Example 9

Preparation of Resin Solution (L-6)

In a vessel equipped with an agitation device, a solvent (S-6) consisting of 712 parts of trifluoroethanol, 231 parts of the resin (b-1) obtained in Production Example 1 and 58 parts of the resin (b-2) obtained in Production Example 2 were charged. The mixture was agitated until the resins (b-1) and (b-2) were dissolved thoroughly to obtain a resin solution (L-6). The insoluble part of the resin (b) to the solvent (S-6) was not more than 0.1 wt % and the SP value of the solvent (S-6) was 15.1.

Production Example 10

Preparation of Resin Precursor (b0-1) Solution

In an autoclave, 407 parts of the resin (b-1) obtained in Production Example 1, 54 parts of isophorone diisocyanate (IPDI) and 485 parts of acetone were charged, then a reaction was carried out in a sealed condition at 100° C. for 5 hours to obtain a resin precursor (b0-1) solution having an isocyanate groups at the terminal of the molecule. The NCO content of the resin precursor (b0-1) solution was 0.8%.

Production Example 11

Preparation of Resin Precursor (b0-2) Solution

In an autoclave, 407 parts of the resin (b-1) obtained in Production Example 1, 50 parts of hexamethylene diisocyanate (HDI) and 482 parts of acetone were charged and a reaction was carried out in a sealed condition at 100° C. for 5 hours to obtain a resin precursor (b0-2) solution having an isocyanate groups at the terminal of the molecule. The NCO content of the resin precursor (b0-2) solution was 0.7%.

Production Example 12

Preparation of Resin Precursor (b0-3)

In an autoclave, 407 parts of the resin (b-1) obtained in Production Example 1, 29 parts of isophorone diisocyanate (IPDI) and 22 parts of hexamethylene diisocyanate (HDI) were charged, and a reaction was carried out in a sealed condition at 100° C. for 5 hours to obtain a resin precursor (b0-3) having an isocyanate groups at the terminal of the molecule. The NCO content of the resin precursor (b0-3) was 1.5%.

Production Example 13

Preparation of Curing Agent (β)

In a reaction vessel equipped with a stirrer, a solvent-removing device and a thermometer, 50 parts of isophorone diamine and 300 parts of methyl ethyl ketone were charged, and a reaction was carried out at 50° C. for 5 hours, then the resulting material was subjected to solvent removal to obtain a curing agent (β) which is a ketimine compound (a chain extender of a urethane prepolymer). The total amine value of the curing agent (β) was 415.

Production Example 14

Preparation of Resin Precursor Solution (L-7)

In a reaction vessel equipped with an agitation device, 711 parts of a solvent (S-7) consisting of dimethylformamide, 231 parts of the resin (b-1) obtained in Production Example 1, 58 parts of the resin precursor (b0-1) solution obtained in Production example 10 and 1.5 parts of the curing agent (β) were charged. The mixture was agitated until these were dissolved thoroughly to obtain a resin solution (L-7). The insoluble part of the resin (b) and the resin precursor (b0) to the solvent (S-7) was not more than 0.1 wt % and the SP value of the solvent (S-7) was 12.0.

Production Example 15

Preparation of Resin Precursor Solution (L-8)

In a vessel equipped with an agitation device, 711 parts of a solvent (S-8) consisting of methyl 2-hydroxyisobutyrate, 231 parts of the resin (b-1) obtained in Production Example 1, 58 parts of the resin precursor (b0-1) solution obtained in Production example 10 and 1.5 parts of the curing agent (β) were charged. The mixture was agitated until these were dissolved thoroughly to obtain a resin solution (L-8). The insoluble part of the resin (b) and the resin precursor (b0) to the solvent (S-8) was not more than 0.1 wt % and the SP value of the solvent (S-8) was 12.1.

Production Example 16

Preparation of Macromonomer (m-1) Solution

In a vessel equipped with an agitation device, 400 parts of THF and 229 parts of tolylene diisocyanate were charged, and after replacing the air in the reaction vessel with nitrogen, it was heated to 40° C. Then 171 parts of hydroxyethyl methacrylate was added dropwise into the reaction vessel over 1 hour, then 0.1 part of triethylamine was added and reacted at 40° C. for 1 hour to obtain a vinyl monomer (m0-1) solution having an isocyanate group at the terminal of the molecule. And then, in a reaction vessel equipped with an agitation device, 398 parts of THF and 398 parts of the resin (b-1) were charged and after replacing the air in the reaction vessel with nitrogen, it was heated to 70° C. to dissolve the resin (b-1) uniformly. Into this vessel, 56 parts of the vinyl monomer (m0-1) solution was added dropwise over 1 hour, then 0.1 part of triethylamine was added and reacted at 70° C. for 3 hour to obtain a macromonomer (m-1) solution. The NCO content of the macromonomer (m-1) solution was 0.0%.

Production Example 17

Preparation of Dispersion Liquid of Microparticle (A-1)

In a reaction vessel equipped with a stirrer, 500 parts of THF was charged, and after replacing the air in the reaction vessel with nitrogen, it was heated to the refluxing temperature. Then a mixture of 160 parts of behenyl acrylate, 60 parts of methacrylic acid, 200 parts of the macromonomer (m-1) solution obtained in Production Example 16, 80 parts of methacryl-modified silicone (SP value 7.6, Mw 12,000, manufactured by Shin-Etsu Chemical Co., Ltd.: X22-2426) and 1.5 parts of azobisisobutyronitrile was added dropwise into the reaction vessel over 2 hours, and aged at the refluxing temperature for 6 hours, to obtain a dispersion liquid of a microparticle (A-1) containing a vinyl resin (a-1). The Mn of the vinyl resin (a-1) was 52,000, and the melting point thereof was 65° C. The SP value of (a-1) is 9.2. The volume average particle diameter of the dispersion liquid of the microparticle (A-1) as determined by LA-920 [same was applied to the measurement of volume average particle diameter of the microparticles (A) and (A') hereinafter.] was 0.15 µm. The degree of swelling of the microparticle (A-1) after removing the solvent was 5%.

Production Example 18

Preparation of Dispersion Liquid of Microparticle (A-2)

A dispersion liquid of a microparticle (A-2) containing a vinyl resin (a-2) was obtained in a similar manner to Production example 17 except that X22-174DX manufactured by Shin-Etsu Chemical Co., Ltd. having the SP value of 7.8 and the Mw of 4,600 was used as a methacryl-modified silicone in Production example 17. The Mn of the vinyl resin (a-2) was 58,000 and the melting point thereof was 66° C. The SP value of (a-2) is 9.2. The volume average particle diameter of the microparticle (A-2) was 0.17 µm and the degree of swelling thereof was 5%.

Production Example 19

Preparation of Dispersion Liquid of Microparticle (A-3)

A dispersion liquid of a microparticle (A-3) containing a vinyl resin (a-3) was obtained in a similar manner to Production example 17 except that the amount of methacryl-modified silicone (SP value 7.6, Mw 12,000, manufactured by Shin-Etsu Chemical Co., Ltd.: X22-2426) in Production example 17 was changed to 20 parts. The Mn of the vinyl resin (a-3) was 52,000 and the melting point thereof was 69° C. The SP value of (a-3) is 9.4. The volume average particle diameter of the microparticle (A-3) was 0.20 µm and the degree of swelling thereof was 5%.

Production Example 20

Preparation of Dispersion Liquid of Microparticle (A-4)

A dispersion liquid of a microparticle (A-4) containing a vinyl resin (a-4) was obtained in a similar manner to Production example 17 except that the amount of methacryl-modified silicone (SP value 7.6, Mw 12,000, manufactured by Shin-Etsu Chemical Co., Ltd.: X22-2426) in Production example 17 was changed to 160 parts. The Mn of the vinyl resin (a-4) was 52,000 and the melting point thereof was 53° C. The SP value of (a-4) is 8.9. The volume average particle diameter of the microparticle (A-4) was 0.10 µm and the degree of swelling thereof was 5%.

Production Example 21

Preparation of Dispersion Liquid of Microparticle (A-5)

A dispersion liquid of a microparticle (A-5) containing a vinyl resin (a-5) was obtained in a similar manner to Production example 17 except that stearyl acrylate was used in place of behenyl acrylate in Production example 17. The Mn of the vinyl resin (a-5) was 52,000 and the melting point thereof was 59° C. The SP value of (a-5) is 9.2. The volume average particle diameter of the microparticle (A-5) was 0.15 µm and the degree of swelling thereof was 5%.

Production Example 22

Preparation of Dispersion Liquid of Microparticle (A-6)

In a reaction vessel equipped with a stirrer, 600 parts of THF was charged, and after replacing the air in the reaction vessel with nitrogen, it was heated to the refluxing temperature. Then a mixture of 213 parts of behenyl acrylate, 80 parts of methacrylic acid, 106 parts of methacryl-modified silicone (SP value 7.6, Mw 12,000, manufactured by Shin-Etsu Chemical Co., Ltd.: X22-2426) and 1.5 parts of azobisisobutyronitrile was added dropwise over 2 hours, and aged at the refluxing temperature for 6 hours, to obtain a dispersion liquid a microparticle (A-6) containing a vinyl resin (a-6). The Mn of the vinyl resin (a-6) was 52,000 and the melting point thereof was 67° C. The SP value of (a-6) is 8.5. The volume average particle diameter of the microparticle (A-6) was 0.13 µm and the degree of swelling thereof was 5%.

Production Example 23

Preparation of Dispersion Liquid of Microparticle (A-7)

A dispersion liquid of a microparticle (A-7) containing a vinyl resin (a-7) was obtained in a similar manner to Production example 17 except that acryl-modified silicone (SP value 7.8, Mw 4,800, manufactured by Shin-Etsu Chemical Co., Ltd.: X22-1615) was used in place of methacryl-modified silicone in Production Example 17. The Mn of the vinyl resin (a-7) was 58,000 and the melting point thereof was 66° C. The SP value of (a-7) is 9.2. The volume average particle diameter of the microparticle (A-7) was 0.16 µm and the degree of swelling thereof was 5%.

Production Example 24

Preparation of Dispersion Liquid of Microparticle (A-8)

A dispersion liquid of microparticle (A-8) containing a vinyl resin (a-8) was obtained in a similar manner to Production example 17 except that methacryl-modified silicone was changed to TM-0701T (manufactured by JNC Corp.) which had an SP value of 8.2 and an Mw of 400. The Mn of the vinyl resin (a-8) was 60,000 and the melting point thereof was 67° C. The SP value of (a-8) is 9.3. The volume average particle diameter of the microparticle (A-8) was 0.14 µm and the degree of swelling thereof was 5%.

Production Example 25

Preparation of Dispersion Liquid of Microparticle (A-9)

A dispersion liquid of a microparticle (A-9) containing a vinyl resin (a-9) was obtained in a similar manner to Production example 17 except that styrene was used in place of macromonomer (m-1) solution in Production Example 17. The Mn of the vinyl resin (a-9) was 52,000 and the melting point thereof was 62° C. The SP value of (a-9) is 8.8. The volume average particle diameter of the microparticle (A-9) was 0.15 μm and the degree of swelling thereof was 5%.

Production Example 26

Preparation of Dispersion Liquid of Microparticle (A-10)

A dispersion liquid of a microparticle (A-10) containing a vinyl resin (a-10) was obtained in a similar manner to Production example 17 except that 30 parts of 2-decyltetradecyl methacrylate was used in place of 80 parts of methacryl-modified silicone in Production Example 17. The Mn of the vinyl resin (a-10) was 36,000 and the melting point thereof was 64° C. The SP value of (a-10) is 9.4. The volume average particle diameter of the microparticle (A-10) was 0.19 μm and the degree of swelling thereof was 1%.

Production Example 27

Preparation of Dispersion Liquid of Microparticle (A-11)

In a reaction vessel equipped with a stirrer, 600 parts of THF was charged, and after replacing the air in the reaction vessel with nitrogen, it was heated to the refluxing temperature. Then a mixture of 213 parts of behenyl acrylate, 80 parts of methacrylic acid, 40 parts of 2-decyltetradecyl methacrylate (SP value: 8.4) and 0.5 part of azobisisobutyronitrile was added dropwise into the reaction vessel over 2 hours, and aged at the refluxing temperature for 6 hours, to obtain a dispersion liquid of a microparticle (A-11) containing a vinyl resin (a-11). The Mn of the vinyl resin (a-11) was 109,000 and the melting point thereof was 63° C. the SP value of (a-11) was 8.8. The volume average particle diameter of the microparticle (A-11) was 0.42 μm, and the degree of swelling thereof was 9%.

Production Example 28

Preparation of Dispersion Liquid of Microparticle (A-12)

In a reaction vessel equipped with a stirrer, 600 parts of THF was charged, and after replacing the air in the reaction vessel with nitrogen, it was heated to the refluxing temperature. Then a mixture of 213 parts of behenyl acrylate, 80 parts of methacrylic acid, 20 parts of methacryl-modified silicone (SP value 7.6, Mw 12,000, manufactured by Shin-Etsu Chemical Co., Ltd.: X22-2426), 20 parts of (2-perfluorooctyl)ethyl methacrylate (SP value: 7.4, manufactured by Kyoeisha Chemical Co., Ltd.: LIGHT ESTER FM-108) and 3.0 parts of azobisisobutyronitrile was added dropwise into the reaction vessel over 2 hours, and aged at the refluxing temperature for 6 hours, to obtain a dispersion liquid of a microparticle (A-12) containing a vinyl resin (a-12). The Mn of the vinyl resin (a-12) was 19,000 and the melting point thereof was 65° C. The SP value of (a-12) was 8.7. The volume average particle diameter of the microparticle (A-12) was 0.11 μm and the degree of swelling thereof was 2%.

Comparative Production Example 1

In a reaction vessel equipped with a stirrer, 500 parts of THF was charged, and after replacing the air in the reaction vessel with nitrogen, it was heated to the reflux temperature. Then a mixture of 60 parts of methacrylic acid, 240 parts of behenyl acrylate, 200 parts of the macromonomer (m-1) solution obtained in Production Example 16 and 1.5 parts of azobisisobutyronitrile was added dropwise into the reaction vessel over 2 hours, and aged at the reflux temperature for 6 hours, to obtain a dispersion liquid of a microparticle (A'-1) containing a vinyl resin (a'-1) for comparison. The Mn of the vinyl resin (a'-1) was 54,000, and the melting point thereof was 69° C. The SP value of (a'-1) is 9.4. The volume average particle diameter of the microparticle (A'-1) was 0.15 μm, and the degree of swelling thereof was 5%.

Comparative Production Example 2

In a reaction vessel equipped with a stirrer, 550 parts of THF was charged, and after replacing the air in the reaction vessel with nitrogen, it was heated to the reflux temperature. Then a mixture of 80 parts of behenyl acrylate, 30 parts of methacrylic acid, 100 parts of the macromonomer (m-1) solution obtained in Production Example 16, 240 parts of methacryl-modified silicone (Mw 12,000, manufactured by Shin-Etsu Chemical Co., Ltd.: X22-2426) and 1.5 parts of azobisisobutyronitrile was added dropwise into the reaction vessel over 2 hours, and aged at the reflux temperature for 6 hours, to obtain a dispersion liquid of a microparticle (A'-2) containing a vinyl resin (a'-2) for comparison. The Mn of the vinyl resin (a'-2) was 52,000, and the melting point thereof was 44° C. The SP value of (a'-2) is 8.4. The volume average particle diameter of the microparticle (A'-2) was 0.15 μm, and the degree of swelling thereof was 5%.

Production Example 29

Preparation of Dispersion Stabilizer (E) Solution

In a reaction vessel equipped with a stirrer, 700 parts of THF was charged, and after replacing the air in the reaction vessel with nitrogen, it was heated to the reflux temperature. Then a mixture of 150 parts of methyl methacrylate, 150 parts of methacryl-modified silicone (Mw 12,000, manufactured by Shin-Etsu Chemical Co., Ltd.: X22-2426) and 1.5 parts of azobisisobutyronitrile was added dropwise into the reaction vessel over 2 hours, and aged at the reflux temperature for 6 hours, to obtain a dispersion stabilizer (E-1) solution. The Mw of (E-1) was 20,000.

Example 1

In an experiment device of FIG. 1, first, valves V1, V2 were closed, and carbon dioxide (purity 99.99 wt %) was introduced into a particle collecting bath T4 from a cylinder B2 and a pump P4 to adjust the pressure and the temperature to 14 MPa and 40° C. Further, a resin solution tank T1 was charged with the resin solution (L-1), and a microparticle dispersion liquid tank T2 was charged with the microparticle (A-1) dispersion liquid. Next, by means of a cylinder B1 and a pump P3, carbon dioxide was introduced into a dispersion bath T3 to adjust the pressure and the temperature to 9 MPa and 40° C., and further the microparticle (A-1) dispersion liquid was introduced from the tank T2 and a pump P2. Next, the resin solution (L-1) was introduced into the dispersion bath T3 from the tank T1 and the pump P1 while inside the dispersion bath T3 was stirred at 2000 rpm. The internal pressure of T3 after introduction was 14 MPa.

The weight ratio of the composition charged into the dispersion bath T3 is as follows.

Resin solution (L-1) 270 parts
    Microparticle (A-1) dispersion liquid 45 parts
    Carbon dioxide 550 parts The weight of the introduced carbon dioxide was determined by calculating the density of carbon dioxide by the condition formula described in the following document from the temperature (40° C.) and the pressure (15 MPa) of carbon dioxide, and multiplying this by the volume of the dispersion bath T3.

Document: Journal of Physical and Chemical Reference data, vol. 25, P. 1509 to 1596

After introducing the resin solution (L-1), stirring was conducted for 1 minute, to obtain a dispersion (X1). After introducing carbon dioxide into T4 from P3 by opening the valve V1, the dispersion (X1) was introduced into T4 and the opening degree of V2 was adjusted so that the pressure was kept constant during this operation. This operation was conducted for 30 seconds, and V1 was closed. By this operation, extraction of the solvent from the resin solution introduced into T4 was conducted. Further, T4 was heated to 60° C., and kept for 15 minutes. By this operation, the microparticle (A-1) was adhered to the surface of the resin particle (B-1) formed from the resin solution (L-1), and the resin particle (C-1) was generated. Next, by keeping the pressure at 14 MPa by the pressure adjustment valve V2 while introducing carbon dioxide into the particle collecting bath T4 from the pressure cylinder B2 and the pump P4, carbon dioxide containing the extracted solvent was discharged to a solvent trap tank T5, and the resin particle (C-1) was captured by a filter F1. In the operation of introducing carbon dioxide into the particle collecting bath T4 from the pressure cylinder B2 and the pump P4, introduction of carbon dioxide was stopped when an amount 5 times the weight of carbon dioxide introduced into the above dispersion bath T3 was introduced into the particle collecting bath T4. At the time of this stopping, the operation of replacing carbon dioxide containing a solvent with carbon dioxide not containing a solvent and capturing the resin particle (C-1) by the filter F1 was completed. Further, the pressure adjustment valve V2 was opened little by little, and the internal pressure of the particle collecting tank was reduced to atmospheric pressure, and the resin particle (C-1) in which a film derived from the microparticle (A) was formed on the surface of the resin particle (B) captured by the filter F1 was obtained.

Example 2

A resin particle (C-2) in which a film derived from the microparticle (A) was formed on the surface of the resin particle (B) was obtained in a similar manner to Example 1 except that the microparticle (A-2) dispersion liquid was used in place of the microparticle (A-1) dispersion liquid in Example 1. The weight ratio of the composition charged into the dispersion bath T3 in Example 2 is as follows.

| | |
|---|---|
| Resin solution (L-1) | 270 parts |
| Microparticle (A-2) dispersion liquid | 45 parts |
| Carbon dioxide | 550 parts |

Example 3

A resin particle (C-3) in which a film derived from the microparticle (A) was formed on the surface of the resin particle (B) was obtained in a similar manner to Example 1 except that the microparticle (A-2) dispersion liquid was used in place of the microparticle (A-1) dispersion liquid, 14 parts of the dispersion stabilizer (E-1) was added, and (L-2) was used in place of the resin solution (L-1) in Example 1. The weight ratio of the composition charged into the dispersion bath T3 in Example 3 is as follows.

| | |
|---|---|
| Resin solution (L-2) | 270 parts |
| Microparticle (A-2) dispersion liquid | 45 parts |
| Dispersion stabilizer (E-1) solution | 14 parts |
| Carbon dioxide | 550 parts |

Example 4

A resin particle (C-4) in which a film derived from the microparticle (A) was formed on the surface of the resin particle (B) was obtained in the same manner as in Example 1 except that (L-7) was used in place of the resin solution (L-1) in Example 1. The weight ratio of the composition charged into the dispersion bath T3 in Example 4 is as follows.

| | |
|---|---|
| Resin solution (L-7) | 270 parts |
| Microparticle (A-1) dispersion liquid | 45 parts |
| Carbon dioxide | 550 parts |

Example 5

A resin particle (C-5) in which a film derived from the microparticle (A) was formed on the surface of the resin particle (B) was obtained in a similar manner to Example 1 except that the microparticle (A-3) dispersion liquid was used in place of the microparticle (A-1) dispersion liquid in Example 1. The weight ratio of the composition charged into the dispersion bath T3 in Example 5 is as follows.

| | |
|---|---|
| Resin solution (L-1) | 270 parts |
| Microparticle (A-3) dispersion liquid | 45 parts |
| Carbon dioxide | 550 parts |

Example 6

A resin particle (C-6) in which a film derived from the microparticle (A) was formed on the surface of the resin particle (B) was obtained in a similar manner to Example 1 except that the microparticle (A-4) dispersion liquid was used in place of the microparticle (A-1) dispersion liquid in Example 1. The weight ratio of the composition charged into the dispersion bath T3 in Example 6 is as follows.

| | |
|---|---|
| Resin solution (L-1) | 270 parts |
| Microparticle (A-4) dispersion liquid | 45 parts |
| Carbon dioxide | 550 parts |

Example 7

A resin particle (C-7) in which a film derived from the microparticle (A) was formed on the surface of the resin particle (B) was obtained in a similar manner to Example 1 except that the microparticle (A-5) dispersion liquid was used in place of the microparticle (A-1) dispersion liquid in Example 1. The weight ratio of the composition charged into the dispersion bath T3 in Example 7 is as follows.

| | |
|---|---|
| Resin solution (L-1) | 270 parts |
| Microparticle (A-5) dispersion liquid | 45 parts |
| Carbon dioxide | 550 parts |

Example 8

A resin particle (C-8) in which a film derived from the microparticle (A) was formed on the surface of the resin particle (B) was obtained in a similar manner to Example 1 except that the microparticle (A-6) dispersion liquid was used in place of the microparticle (A-1) dispersion liquid in Example 1. The weight ratio of the composition charged into the dispersion bath T3 in Example 8 is as follows.

| | |
|---|---|
| Resin solution (L-1) | 270 parts |
| Microparticle (A-6) dispersion liquid | 45 parts |
| Carbon dioxide | 550 parts |

Example 9

A resin particle (C-9) in which a film derived from the microparticle (A) was formed on the surface of the resin particle (B) was obtained in a similar manner to Example 1 except that (L-8) was used in place of the resin solution (L-1), and 14 parts of the dispersion stabilizer (E-1) was added in Example 1. The weight ratio of the composition charged into the dispersion bath T3 in Example 9 is as follows.

| | |
|---|---|
| Resin solution (L-8) | 270 parts |
| Microparticle (A-1) dispersion liquid | 45 parts |
| Dispersion stabilizer (E-1) solution | 14 parts |
| Carbon dioxide | 550 parts |

Example 10

A resin particle (C-10) in which a film derived from the microparticle (A) was formed on the surface of the resin particle (B) was obtained in a similar manner to Example 1 except that the microparticle (A-7) dispersion liquid was used in place of the microparticle (A-1) dispersion liquid in Example 1. The weight ratio of the composition charged into the dispersion bath T3 in Example 10 is as follows.

| | |
|---|---|
| Resin solution (L-1) | 270 parts |
| Microparticle (A-7) dispersion liquid | 45 parts |
| Carbon dioxide | 550 parts |

Example 11

A resin particle (C-11) in which a film derived from the microparticle (A) was formed on the surface of the resin particle (B) was obtained in a similar manner to Example 1 except that the microparticle (A-8) dispersion liquid was used in place of the microparticle (A-1) dispersion liquid in Example 1. The weight ratio of the composition charged into the dispersion bath T3 in Example 11 is as follows.

| | |
|---|---|
| Resin solution (L-1) | 270 parts |
| Microparticle (A-8) dispersion liquid | 45 parts |
| Carbon dioxide | 550 parts |

Example 12

A resin particle (C-12) in which a film derived from the microparticle (A) was formed on the surface of the resin particle (B) was obtained in a similar manner to Example 1 except that the microparticle (A-9) dispersion liquid was used in place of the microparticle (A-1) dispersion liquid in Example 1. The weight ratio of the composition charged into the dispersion bath T3 in Example 12 is as follows.

| | |
|---|---|
| Resin solution (L-1) | 270 parts |
| Microparticle (A-9) dispersion liquid | 45 parts |
| Carbon dioxide | 550 parts |

Example 13

A resin particle (C-13) in which a film derived from the microparticle (A) was formed on the surface of the resin particle (B) was obtained in a similar manner to Example 1 except that the microparticle (A-10) dispersion liquid was used in place of the microparticle (A-1) dispersion liquid in Example 1. The weight ratio of the composition charged into the dispersion bath T3 in Example 13 is as follows.

| | |
|---|---|
| Resin solution (L-1) | 270 parts |
| Microparticle (A-10) dispersion liquid | 45 parts |
| Carbon dioxide | 550 parts |

Example 14

A resin particle (C-14) in which a film derived from the microparticle (A) was formed on the surface of the resin particle (B) was obtained in a similar manner to Example 1 except that the microparticle (A-11) dispersion liquid was used in place of the microparticle (A-1) dispersion liquid in Example 1. The weight ratio of the composition charged into the dispersion bath T3 in Example 14 is as follows.

| | |
|---|---|
| Resin solution (L-1) | 270 parts |
| Microparticle (A-11) dispersion liquid | 45 parts |
| Carbon dioxide | 550 parts |

Example 15

A resin particle (C-15) in which a film derived from the microparticle (A) was formed on the surface of the resin particle (B) was obtained in a similar manner to Example 1 except that the microparticle (A-12) dispersion liquid was used in place of the microparticle (A-1) dispersion liquid in Example 1. The weight ratio of the composition charged into the dispersion bath T3 in Example 15 is as follows.

| Resin solution (L-1) | 270 parts |
|---|---|
| Microparticle (A-12) dispersion liquid | 45 parts |
| Carbon dioxide | 550 parts |

Example 16

A resin particle (C-16) in which a film derived from the microparticle (A) was formed on the surface of the resin particle (B) was obtained in a similar manner to Example 1 except that (L-3) was used in place of the resin solution (L-1) in Example 1. The weight ratio of the composition charged into the dispersion bath T3 in Example 16 is as follows.

| Resin solution (L-3) | 270 parts |
|---|---|
| Microparticle (A-1) dispersion liquid | 45 parts |
| Carbon dioxide | 550 parts |

Example 17

A resin particle (C-17) in which a film derived from the microparticle (A) was formed on the surface of the resin particle (B) was obtained in a similar manner to Example 1 except that (L-4) was used in place of the resin solution (L-1) in Example 1. The weight ratio of the composition charged into the dispersion bath T3 in Example 17 is as follows.

| Resin solution (L-4) | 270 parts |
|---|---|
| Microparticle (A-1) dispersion liquid | 45 parts |
| Carbon dioxide | 550 parts |

Example 18

A resin particle (C-18) in which a film derived from the microparticle (A) was formed on the surface of the resin particle (B) was obtained in a similar manner to Example 1 except that (L-5) was used in place of the resin solution (L-1) in Example 1. The weight ratio of the composition charged into the dispersion bath T3 in Example 18 is as follows.

| Resin solution (L-5) | 270 parts |
|---|---|
| Microparticle (A-1) dispersion liquid | 45 parts |
| Carbon dioxide | 550 parts |

Example 19

A resin particle (C-19) in which a film derived from the microparticle (A) was formed on the surface of the resin particle (B) was obtained in a similar manner to Example 1 except that (L-6) was used in place of the resin solution (L-1) in Example 1. The weight ratio of the composition charged into the dispersion bath T3 in Example 19 is as follows.

| Resin solution (L-6) | 270 parts |
|---|---|
| Microparticle (A-1) dispersion liquid | 45 parts |
| Carbon dioxide | 550 parts |

Example 20

A resin particle (C-20) in which a film derived from the microparticle (A) was formed on the surface of the resin particle (B) was obtained in a similar manner to Example 1 except that the resin precursor (b0-2) solution and 20 parts of ion exchange water were used in place of the resin solution (L-1) in Example 1. The weight ratio of the composition charged into the dispersion bath T3 in Example 20 is as follows.

| Resin precursor (b0-2) solution | 270 parts |
|---|---|
| Ion exchange water (water for ketimine elongation) | 20 parts |
| Microparticle (A-1) dispersion liquid | 45 parts |
| Carbon dioxide | 550 parts |

Example 21

A resin particle (C-21) in which a film derived from the microparticle (A) was formed on the surface of the resin particle (B) was obtained in a similar manner to Example 1 except that the resin precursor (b0-3) powder and 20 parts of ion exchange water were used in place of the resin solution (L-1) in Example 1. The weight ratio of the composition charged into the dispersion bath T3 in Example 21 is as follows.

| Resin precursor (b0-3) powder | 130 parts |
|---|---|
| Ion exchange water (water for ketimine elongation) | 20 parts |
| Microparticle (A-1) dispersion liquid | 45 parts |
| Carbon dioxide | 650 parts |

Comparative Example 1

A comparative resin particle (C'-1) in which a film derived from the microparticle (A') was formed on the surface of the resin particle (B) was obtained in a similar manner to Example 1 except that the microparticle (A'-1) dispersion liquid was used in place of the microparticle (A-1) dispersion liquid in Example 1. The weight ratio of the composition charged into the dispersion bath T3 in Comparative Example 1 is as follows.

| Resin solution (L-1) | 270 parts |
|---|---|
| Comparative microparticle (A'-1) dispersion liquid | 45 parts |
| Carbon dioxide | 550 parts |

Comparative Example 2

A comparative resin particle (C'-2) in which a film derived from the microparticle (A') was formed on the surface of the resin particle (B) was obtained in a similar manner to Example 1 except that the microparticle (A'-2) dispersion liquid was used in place of the microparticle (A-1) dispersion liquid in Example 1. The weight ratio of the composition charged into the dispersion bath T3 in Comparative Example 2 is as follows.

| Resin solution (L-1) | 270 parts |
|---|---|
| Comparative microparticle (A'-2) dispersion liquid | 45 parts |
| Carbon dioxide | 550 parts |

Comparative Example 3

A comparative resin particle (C'-3) in which the microparticle (A') was adhered to the surface of the resin particle (B)

was obtained in a similar manner to Example 1 except that a microparticle (A'-3) comprising hydrophobic silica (RX-50, manufactured by Nippon Aerosil Co., Ltd., volume average particle diameter 150 nm) having a degree of swelling of 0% was preliminarily charged into T3 in place of the microparticle (A-1) dispersion liquid in Example 1. The weight ratio of the composition charged into the dispersion bath T3 in Comparative Example 3 is as follows.

| | |
|---|---|
| Resin solution (L-1) | 270 parts |
| Comparative microparticle (A'-3) | 7 parts |
| Carbon dioxide | 550 parts |

The raw materials and physical property values of the resin particles of the present invention and the comparative resin particles were shown in Tables 1 to 3.

Evaluation Results

For the resin particles obtained in Examples 1 to 21 and Comparative Examples 1 to 3, surface wettability, size distribution, thermal storage stability, hygrothermal storage stability and low-temperature fusibility (melting temperature) were evaluated by the following evaluation methods, and the results were shown in Tables 4 to 6.

<Evaluation of Surface Wettability>

The solubility parameter (5m) was calculated according to the method described above.

<Evaluation of Size Distribution>

Resin particles were dispersed in an aqueous sodium dodecylbenzene sulfonate solution (concentration 0.1 wt %), and the volume average particle diameter/number average particle diameter of the resin particles (represented by C in the tables) was measured by a Coulter counter [Multisizer III (manufactured by Beckman Coulter, Inc.)]. The smaller the volume average particle diameter/number average particle diameter, the sharper the size distribution is meant.

<Evaluation of Thermal Storage Stability>

The thermal storage stability of the resin particles was evaluated by the following method. That is, the resin particles were kept still for 15 hours in a dryer whose temperature was controlled to 50° C., and evaluation was made according to the following criteria from the degree of blocking.

◯: blocking did not occur

Δ: blocking occurred, but easily unraveled by simply applying force with a finger or the like x: blocking occurred, and did not easily unravel by simply applying force with a finger or the like <Evaluation of Hygrothermal Storage Stability>

The hygrothermal storage stability of the resin particles was evaluated by the following method. That is, the resin particles were kept still for 15 hours in a thermo-hygrostat set at a temperature of 50° C. and a humidity of 80%, and evaluation was made according to the following criteria from the degree of blocking.

◯: blocking did not occur

Δ: blocking occurred, but easily unraveled by simply applying force with a finger or the like x: blocking occurred, and did not easily unravel by simply applying force with a finger or the like <Evaluation of Low-Temperature Fusibility>

The resin particles obtained in Examples 1 to 21 and Comparative Examples 1 to 3 were used, and each resin particle was added with 1.0 wt % of AEROSIL R972 (manufactured by Nippon Aerosil Co., Ltd.), and the resultant was mixed well by using a mixer to make a resin particle for evaluation of the low-temperature fusibility (resin particle for electrophotographic toner) in which AEROSIL R972 was uniformly attached to the surface of the resin particle.

Each 5 mg of the obtained sample was weighed, and the low-temperature fusibility (melting temperature) was evaluated by DSC (differential scanning calorimetry) (measuring device: RDC220, manufactured by SII Nano Technology Inc.) at a temperature rising speed of 10° C. per minute. When the melting temperature is no greater than 125° C., the low-temperature fusibility is considered to be excellent.

TABLE 1

| | Example | | | | | | | |
|---|---|---|---|---|---|---|---|---|
| | 1 | 2 | 3 | 4 | 5 | 6 | 7 | 8 |
| Microparticle (A) | A-1 | A-2 | A-2 | A-1 | A-3 | A-4 | A-5 | A-6 |
| resin (a) | a-1 | a-2 | a-2 | a-1 | a-3 | a-4 | a-5 | a-6 |
| Composition of (a) | silicone-containing vinyl resin | silicone-containing vinyl resin | silicone-containing vinyl resin | silicone-containing vinyl resin | silicone-containing vinyl resin | silicone-containing vinyl resin | silicone-containing vinyl resin | silicone-containing vinyl resin |
| Melting point of (a) (° C.) | 65 | 66 | 66 | 65 | 69 | 53 | 59 | 67 |
| Number average molecular weight of (a) | 52,000 | 58,000 | 58,000 | 52,000 | 52,000 | 52,000 | 52,000 | 52,000 |
| Degree of swelling of (A) | 5 | 5 | 5 | 5 | 5 | 5 | 5 | 5 |
| Volume average particle diameter of (A) [μm] | 0.15 | 0.17 | 0.17 | 0.15 | 0.20 | 0.10 | 0.15 | 0.13 |
| resin (b) | (b-1) + (b-2) | (b-1) + (b-2) | (b-3) | (b-1) + (b0-1) + β | (b-1) + (b-2) | (b-1) + (b-2) | (b-1) + (b-2) | (b-1) + (b-2) |
| Composition of (b) | polyester | polyester | vinyl resin | polyester and urethane composite | polyester | polyester | polyester | polyester |
| SP value of solvent (S) | 11.8 | 11.8 | 11.3 | 12.0 | 11.8 | 11.8 | 11.8 | 11.8 |
| Resin solution (L) | L-1 | L-1 | L-2 | L-7 | L-1 | L-1 | L-1 | L-1 |
| Solvent (S) | S-1 | S-1 | S-2 | S-7 | S-1 | S-1 | S-1 | S-1 |
| Dispersion stabilizer (E) | — | — | E-1 | — | — | — | — | — |
| Resin particle (C) | C-1 | C-2 | C-3 | C-4 | C-5 | C-6 | C-7 | C-8 |

TABLE 2

|  | Example | | | | | | | |
|---|---|---|---|---|---|---|---|---|
|  | 9 | 10 | 11 | 12 | 13 | 14 | 15 | 16 |
| Microparticle (A) | A-1 | A-7 | A-8 | A-9 | A-10 | A-11 | A-12 | A-1 |
| resin (a) | a-1 | a-7 | a-8 | a-9 | a-10 | a-11 | a-12 | a-1 |
| Composition of (a) | silicone-containing vinyl resin | silicone-containing vinyl resin | silicone-containing vinyl resin | silicone-containing vinyl resin | branched alkyl containing vinyl resin | branched alkyl containing vinyl resin | silicone-containing vinyl resin | silicone-containing vinyl resin |
| Melting point of (a) (° C.) | 65 | 66 | 67 | 62 | 64 | 63 | 65 | 65 |
| Number average molecular weight of (a) | 52,000 | 58,000 | 60,000 | 52,000 | 36,000 | 109,000 | 19,000 | 52,000 |
| Degree of swelling of (A) | 5 | 5 | 5 | 5 | 1 | 9 | 2 | 5 |
| Volume average particle diameter of (A) [μm] | 0.15 | 0.16 | 0.14 | 0.15 | 0.19 | 0.42 | 0.11 | 0.15 |
| resin (b) | (b-1) + (b0-1) + β | (b-1) + (b-2) | (b-1) + (b-2) | (b-1) + (b-2) | (b-1) + (b-2) | (b-1) + (b-2) | (b-1) + (b-2) | (b-1) + (b-2) |
| Composition of (b) | polyester and urethane composite | polyester | polyester | polyester | polyester | polyester | polyester | polyester |
| SP value of solvent (S) | 12.1 | 11.8 | 11.8 | 11.8 | 11.8 | 11.8 | 11.8 | 9.4 |
| Resin solution (L) | L-8 | L-1 | L-1 | L-1 | L-1 | L-1 | L-1 | L-3 |
| Solvent (S) | S-8 | S-1 | S-1 | S-1 | S-1 | S-1 | S-1 | S-3 |
| Dispersion stabilizer (E) | E-1 | — | — | — | — | — | — | — |
| Resin particle (C) | C-9 | C-10 | C-11 | C-12 | C-13 | C-14 | C-15 | C-16 |

TABLE 3

|  | Example | | | | | Comparative Example | | |
|---|---|---|---|---|---|---|---|---|
|  | 17 | 18 | 19 | 20 | 21 | 1 | 2 | 3 |
| Microparticle (A) | A-1 | A-1 | A-1 | A-1 | A-1 | A'-1 | A'-2 | A'-3 |
| resin (a) | a-1 | a-1 | a-1 | a-1 | a-1 | a'-1 | a'-2 | — |
| Composition of (a) | silicone-containing vinyl resin | silicone-containing vinyl resin | silicone-containing vinyl resin | silicone-containing vinyl resin | silicone-containing vinyl resin | vinyl resin | silicone-containing vinyl resin | hydrophobic silica |
| Melting point of (a) (° C.) | 65 | 65 | 65 | 65 | 65 | 69 | 44 | — |
| Number average molecular weight of (a) | 52,000 | 52,000 | 52,000 | 52,000 | 52,000 | 52,000 | 52,000 | — |
| Degree of swelling of (A) | 5 | 5 | 5 | 5 | 5 | 5 | 5 | 0 |
| Volume average particle diameter of (A) [μm] | 0.15 | 0.15 | 0.15 | 0.15 | 0.15 | 0.15 | 0.15 | 0.15 |
| resin (b) | (b-1) + (b-2) | (b-1) + (b-2) | (b-1) + (b-2) | (b0-2) + water | (b0-3) + water | (b-1) + (b-2) | (b-1) + (b-2) | (b-1) + (b-2) |
| Composition of (b) | polyester | polyester | polyester | polyester and urethane composite | polyester and urethane composite | polyester | polyester | polyester |
| SP value of solvent (S) | 11.3 | 12.4 | 15.1 | — | — | 11.8 | 11.8 | 11.8 |
| Resin solution (L) | L-4 | L-5 | L-6 | — | — | L-1 | L-1 | L-1 |
| Solvent (S) | S-4 | S-5 | S-6 | — | — | S-1 | S-1 | S-1 |
| Dispersion stabilizer (E) | — | — | — | — | — | — | — | — |
| Resin particle (C) | C-17 | C-18 | C-19 | C-20 | C-21 | C'-1 | C'-2 | C'-3 |

TABLE 4

|  | Example | | | | | | | |
|---|---|---|---|---|---|---|---|---|
|  | 1 | 2 | 3 | 4 | 5 | 6 | 7 | 8 |
| Volume average particle diameter of (C) [μm] | 5.8 | 5.8 | 5.2 | 5.3 | 6.0 | 5.6 | 5.8 | 5.7 |
| Volume average particle diameter/number average particle diameter of (C) | 1.15 | 1.15 | 1.17 | 1.16 | 1.15 | 1.15 | 1.15 | 1.16 |
| Volume average particle diameter ratio of (A)/(C) | 0.026 | 0.029 | 0.029 | 0.029 | 0.033 | 0.018 | 0.025 | 0.023 |

TABLE 4-continued

|  | Example | | | | | | | |
|---|---|---|---|---|---|---|---|---|
|  | 1 | 2 | 3 | 4 | 5 | 6 | 7 | 8 |
| Shape | spherical | Spherical | Spherical | Spherical | Spherical | Spherical | Spherical | Spherical |
| Thermal storage stability | ○ | ○ | ○ | ○ | ○ | ○ | ○ | ○ |
| Hygrothermal storage stability | ○ | ○ | ○ | ○ | ○ | ○ | ○ | ○ |
| low-temperature fusibility (° C.) | 120 | 120 | 125 | 125 | 120 | 120 | 125 | 125 |
| Surface wettability (Solubility parameter) | 18 | 18 | 18 | 18 | 18 | 18 | 18 | 18 |

TABLE 5

|  | Example | | | | | | | |
|---|---|---|---|---|---|---|---|---|
|  | 9 | 10 | 11 | 12 | 13 | 14 | 15 | 16 |
| Volume average particle diameter of (C) [μm] | 5.8 | 5.6 | 5.6 | 5.5 | 3.9 | 6.6 | 7.8 | 5.9 |
| Volume average particle diameter/number average particle diameter of (C) | 1.15 | 1.15 | 1.15 | 1.15 | 1.18 | 1.18 | 1.15 | 1.15 |
| Volume average particle diameter ratio of (A)/(C) | 0.029 | 0.029 | 0.029 | 0.025 | 0.049 | 0.064 | 0.014 | 0.025 |
| Shape | Spherical | Spherical | Spherical | Spherical | Spherical | Spherical | Spherical | Spherical |
| Thermal storage stability | ○ | ○ | ○ | ○ | ○ | ○ | ○ | ○ |
| Hygrothermal storage stability | ○ | ○ | ○ | ○ | ○ | ○ | ○ | ○ |
| low-temperature fusibility (° C.) | 125 | 120 | 120 | 120 | 120 | 125 | 125 | 120 |
| Surface wettability (Solubility parameter) | 18 | 18 | 18 | 18 | 17 | 20 | 19 | 18 |

TABLE 6

|  | Example | | | | | Comparative example | | |
|---|---|---|---|---|---|---|---|---|
|  | 17 | 18 | 19 | 20 | 21 | 1 | 2 | 3 |
| Volume average particle diameter of (C) [μm] | 5.9 | 5.6 | 5.2 | 5.3 | 5.9 | 6.0 | 6.0 | 4.0 |
| Volume average particle diameter/number average particle diameter of (C) | 1.16 | 1.16 | 1.14 | 1.14 | 1.15 | 1.25 | 1.17 | 1.15 |
| Volume average particle diameter ratio of (A)/(C) | 0.025 | 0.027 | 0.029 | 0.030 | 0.025 | 0.025 | 0.025 | 0.038 |
| Shape | Spherical | Spherical | Spherical | Spherical | Spherical | Spherical | Spherical | Spherical |
| Thermal storage stability | ○ | ○ | ○ | ○ | ○ | ○ | Δ | ○ |
| Hygrothermal storage stability | ○ | ○ | ○ | ○ | ○ | ○ | Δ | ○ |
| low-temperature fusibility (° C.) | 125 | 120 | 120 | 125 | 125 | 120 | 120 | 160 |
| Surface wettability (Solubility parameter) | 18 | 18 | 18 | 18 | 18 | 18 | 18 | 18 |

While the resin particles obtained in Examples 1 to 21 showed small volume average particle diameter/number average particle diameter, had a sharp size distribution, and were excellent in low-temperature fusibility, the resin particles obtained in Comparative Example 1 showed a poor size distribution. The resin particles obtained in Comparative Example 2 had a sharp size distribution but were poor in thermal storage stability. The resin particles obtained in Comparative Example 3 had a sharp size distribution but were poor in low-temperature fusibility.

INDUSTRIAL APPLICABILITY

The resin particles of the present invention are useful as a base particle for electrophotographic toner, an additive for paints, an additive for cosmetics, an additive for paper coating, a resin for slush molding, a powdery paint, a spacer for production of electronic components, a standard particle for electronic measuring devices, a particle for electronic paper, a carrier for medical diagnosis, a particle for electric viscosity, and resin particles for other molding applications.

DESCRIPTION OF REFERENCE SIGNS

T1: Resin solution tank
T2: Microparticle dispersion liquid tank
T3: Dispersion bath (maximum use pressure 20 MPa, maximum use temperature 100° C., equipped with a stirrer)
T4: Particle collecting bath (maximum use pressure 20 MPa, maximum use temperature 100° C.)
F1: Ceramic filter (mesh: 0.5 μm)
T5: Solvent trap
B1, B2: Carbon dioxide cylinder
P1, P2: Solution pump
P3, P4: Carbon dioxide pump
V1: Valve
V2: Pressure adjustment valve

The invention claimed is:

1. A resin particle (C) comprising a microparticle (A) containing a resin (a) being coated to or adhered to the surface of a resin particle (B) containing a resin (b),
wherein the degree of swelling of the microparticle (A) resulting from liquid or supercritical carbon dioxide (X) at a temperature less than the glass transition temperature or the melting point of the microparticle (A) is no greater than 16%, and the resin (a) contains, as a constituent unit, 0.1 to 50 wt % of a non-crystalline non-halogen vinyl monomer (m1) having a solubility parameter [SP value: $(cal/cm^3)^{1/2}$] of 7 to 9, and
wherein the non-crystalline non-halogen vinyl monomer (m1) is at least one kind of vinyl monomer selected from the group consisting of a silicone-containing vinyl monomer (m11) and a branched alkyl group-containing vinyl monomer (m12) having a carbon number of 8 to 30.

2. The resin particle (C) according to claim 1, wherein the resin (a) further contains, as a constituent unit, 30 to 99.9 wt % of a crystalline vinyl monomer (m2).

3. The resin particle (C) according to claim 2, wherein the particle diameter of the microparticle (A) is 0.01 to 1.0 μm.

4. The resin particle (C) according to claim 2, wherein a surface-active substance having a hydrophilic group is not substantially contained.

5. The resin particle (C) according to claim 1, wherein the particle diameter of the microparticle (A) is 0.01 to 1.0 μm.

6. The resin particle (C) according to claim 1, wherein a surface-active substance having a hydrophilic group is not substantially contained.

7. A method for producing the resin particle (C) according to claim 1, comprising the steps of: dispersing a precursor (b0) of a resin (b) in liquid or supercritical carbon dioxide (X) in which a microparticle (A) is dispersed; allowing the precursor (b0) to react to form a resin particle (C) in which the microparticle (A) is adhered to the surface of a resin particle (B) containing the resin (b); and then removing the liquid or supercritical carbon dioxide (X) to obtain the resin particle (C).

8. A method for producing the resin particle (C) according to claim 1, comprising the steps of: dispersing a solution (L), which is obtained by dissolving a resin (b) in a solvent (S), in liquid or supercritical carbon dioxide (X) in which a microparticle (A) is dispersed to form a resin particle (C1) in which the microparticle (A) is adhered to the surface of a resin particle (B1) containing the resin (b) and the solvent (S); and then removing the liquid or supercritical carbon dioxide (X) and the solvent (S) to obtain a resin particle (C).

9. The production method according to claim 8, wherein after the resin particle (C1) is formed, the liquid or supercritical carbon dioxide (X) containing the solvent (S) is replaced with carbon dioxide not containing the solvent (S) so as to remove or reduce the solvent (S) contained in (C1), and then carbon dioxide is removed by reducing the pressure.

10. The production method according to claim 8, wherein the weight of an insoluble content of the resin (b) or the precursor (b0) in an equivalent weight mixture of the solvent (S) and the resin (b) or the precursor (b0) at 23° C. and 0.1 MPa is no greater than 20 wt % relative to the weight of the resin (b) or the precursor (b0), and the solubility parameter of the solvent (S) is 9 to 16.

11. The production method according to claim 8, wherein the solvent (S) is dimethylformamide, a cyclic ether, a pyruvic acid ester, an ethylene glycol monoalkyl ether, a propylene glycol monoalkyl ether, a 2-hydroxyisobutyric acid ester, a lactic acid ester, a fluorine-containing alcohol, a mixed solvent of acetone, methanol and water, a mixed solvent of acetone and methanol, a mixed solvent of acetone and ethanol, a mixed solvent of acetone and water, or a mixed solvent of methyl ethyl ketone and water.

12. A method for producing the resin particle (C) according to claim 1, comprising the steps of: dispersing a solution (L0), which is obtained by dissolving a precursor (b0) of a resin (b) in a solvent (S), in liquid or supercritical carbon dioxide (X) in which a microparticle (A) is dispersed; allowing the precursor (b0) to react to form a resin particle (C1) in which the microparticle (A) is adhered to the surface of a resin particle (B1) containing the resin (b) and the solvent (S); and then removing the liquid or supercritical carbon dioxide (X) and the solvent (S) to obtain a resin particle (C).

13. The production method according to claim 12, wherein after the resin particle (C1) is formed, the liquid or supercritical carbon dioxide (X) containing the solvent (S) is replaced with carbon dioxide not containing the solvent (S) so as to remove or reduce the solvent (S) contained in (C1), and then carbon dioxide is removed by reducing the pressure.

14. The production method according to claim 12, wherein the weight of an insoluble content of the precursor (b0) in an equivalent weight mixture of the solvent (S) and the precursor (b0) at 23° C. and 0.1 MPa is no greater than 20 wt % relative to the weight of the precursor (b0), and the solubility parameter of the solvent (S) is 9 to 16.

15. The production method according to claim 12, wherein the solvent (S) is dimethylformamide, a cyclic ether, a pyruvic acid ester, an ethylene glycol monoalkyl ether, a propylene glycol monoalkyl ether, a 2-hydroxyisobutyric acid ester, a lactic acid ester, a fluorine-containing alcohol, a mixed solvent of acetone, methanol and water, a mixed solvent of acetone and methanol, a mixed solvent of acetone and ethanol, a mixed solvent of acetone and water, or a mixed solvent of methyl ethyl ketone and water.

* * * * *